US006622177B1

(12) United States Patent
Eilert et al.

(10) Patent No.: US 6,622,177 B1
(45) Date of Patent: Sep. 16, 2003

(54) DYNAMIC MANAGEMENT OF ADDRESSES TO AN INPUT/OUTPUT (I/O) DEVICE

(75) Inventors: Catherine K. Eilert, Wappingers Falls, NY (US); Gary M. King, Millbrook, NY (US); Peter B. Yocom, Wappingers Falls, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 09/626,519

(22) Filed: Jul. 27, 2000

(51) Int. Cl.$^7$ .................................................. G06F 3/00
(52) U.S. Cl. .............................. 710/3; 710/9; 710/52; 709/249
(58) Field of Search .............................. 710/1, 3, 5, 9, 710/26, 36, 52, 62; 709/200, 208, 209, 245; 712/28, 31, 203

(56) References Cited

U.S. PATENT DOCUMENTS

| | | | |
|---|---|---|---|
| 4,922,410 A | * 5/1990 | Morikawa et al. | 364/200 |
| 5,175,822 A | * 12/1992 | Dixion et al. | 395/272 |
| 5,197,069 A | 3/1993 | Cook et al. | 371/7 |
| 5,473,773 A | 12/1995 | Aman et al. | 395/650 |
| 5,500,852 A | 3/1996 | Riley | 370/16 |
| 5,504,894 A | 4/1996 | Ferguson et al. | 395/650 |
| 5,537,542 A | 7/1996 | Eilert et al. | 395/184.01 |
| 5,603,029 A | 2/1997 | Aman et al. | 395/675 |
| 5,675,739 A | 10/1997 | Eilert et al. | 395/200.11 |
| 5,790,789 A | 8/1998 | Suarez | 395/200.32 |
| 5,878,272 A | * 3/1999 | Yanagisawa et al. | 710/3 |
| 5,881,238 A | 3/1999 | Aman et al. | 395/200.56 |
| 5,897,666 A | 4/1999 | Mallick et al. | 711/217 |
| 5,938,776 A | 8/1999 | Sicola et al. | 714/25 |

(List continued on next page.)

OTHER PUBLICATIONS

"Enterprise Systems Architecture/390—Principles of Operation", SA22–7201–04.
"OS/390 MVS Planning: Workload Management", GC28–1761–12.
OS/390 MVS Programming: Workload Management Services, GC28–1773–08.
DFSMS/MVS Software Support for IBM Enterprise, Storage Server, SC26–7318–00.
IBM Total Storage—Enterprise Storage Server User's Guide 2105 Models E10, E20, F10 and F 20, SC26–7295–04.

(List continued on next page.)

*Primary Examiner*—Jeffrey Gaffin
*Assistant Examiner*—RiJue Mai
(74) *Attorney, Agent, or Firm*—Andrew J. Wojnicki, Jr.

(57) ABSTRACT

Disclosed is a method and computer program device for dynamically managing the assignment of alias addresses to base addresses referencing an input/output (I/O) device, such as a direct access storage device (DASD). Two distinct methods are disclosed. In one method, alias addresses are assigned based on the performance of the I/O devices. In this method, alias addresses are assigned to highly utilized devices, as indicated by device performance data, in order to maximize the efficient utilization of I/O device resources. In a second method, workload management principles are utilized to assign alias addresses. In this method, a correlation is made between each I/O device and the service classes utilizing each device. As in the first method, performance data is generated for each I/O device. Alias addresses are assigned to I/O devices experiencing queue delays as indicated by their performance data, if the device is associated with a service class that has failed to meet one or more processing goals. These methods may operate on a single host, or in a multi-host environment. The methods may be operated individually, or concurrently. Methods are disclosed to manage contention between concurrently operating assignment methods, and between multiple hosts concurrently operating one or more assignment methods.

23 Claims, 17 Drawing Sheets

U.S. PATENT DOCUMENTS

| | | | |
|---|---|---|---|
| 5,974,462 A | 10/1999 | Aman et al. | 709/225 |
| 6,058,412 A | 5/2000 | Kojima et al. | 709/100 |
| 6,085,217 A | 7/2000 | Ault et al. | 709/105 |
| 6,092,178 A | 7/2000 | Jindal et al. | 712/27 |
| 6,167,459 A | 12/2000 | Beardsley et al. | 710/3 |
| 6,170,023 B1 | 1/2001 | Beardsley et al. | 710/36 |
| 6,185,638 B1 | 2/2001 | Beardsley et al. | 710/36 |
| 6,202,095 B1 | 3/2001 | Beardsley et al. | 709/227 |
| 6,249,800 B1 | 6/2001 | Aman et al. | 709/105 |
| 6,289,377 B1 * | 9/2001 | Lalwaney et al. | 709/222 |
| 6,442,583 B1 | 8/2002 | Eilert et al. | 709/104 |

OTHER PUBLICATIONS

IBM Total Storage—Enterprise Storage Server—Host Systems Attachment Guide, 2105 Models E10, E20, F10 and F20 SC26–7296–05.

IBM Enterprise Storage Server—System/390 Command Reference—2105 Models E10 and E20, SC26–7298–00.

IBM Enterprise Storage Server—Introduction and Planning Guide—2105 Models E10, E20, F10 and F20, GC26–7294–03.

IBM StorWatch Expert Hands On Usage Guide, Jul. 1, 2001, SG24–6102–01.

IBM Total Storage Enterprise Storage Server: Implementing the ESS in Your Environment, Mar. 2002, SG24–5420–01.

IBM Enterprise Storage Server, Sep. 2001, SG24–5465–01.

IBM Enterprise Storage Server 2105 Models E10/E20 Service Guide, SY27–7605–10.

IBM Enterprise Storage Server Performance Monitoring and Tuning Guide, SG24–5656–00.

IBM 3990/9390 Storage Control Reference, GA32–0274–04.

* cited by examiner

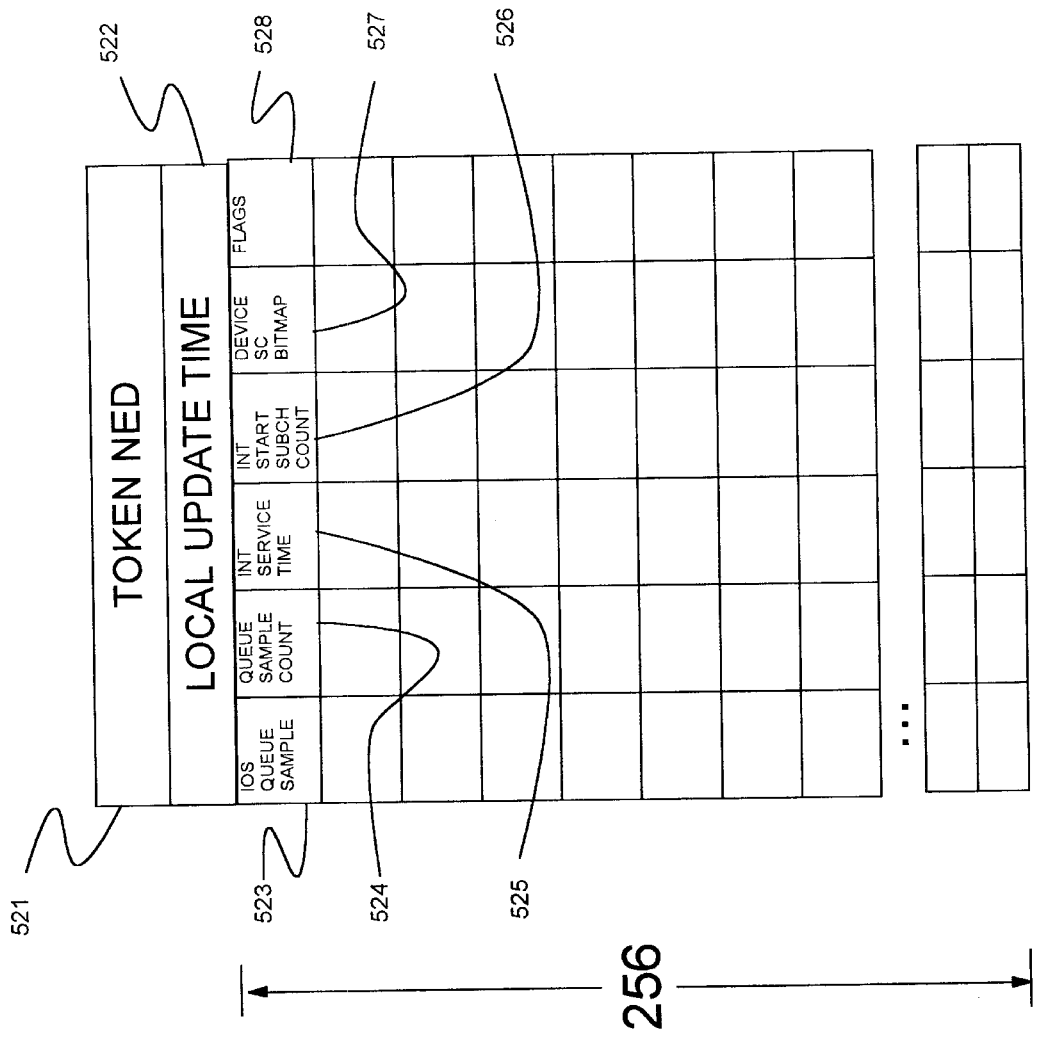
FIGURE 5 - LOCAL PAV DATA TABLE

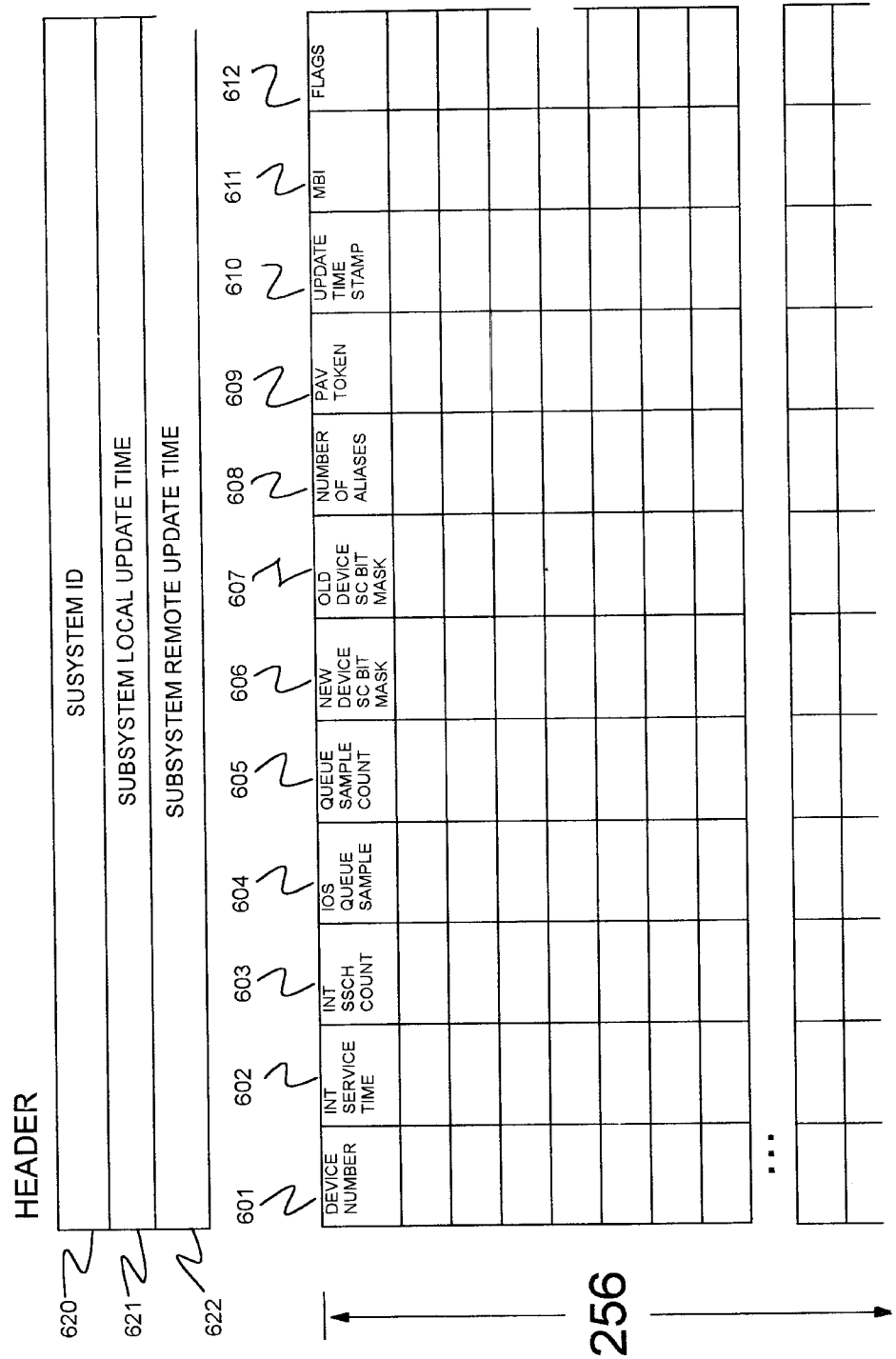
FIGURE 6 - SYSPLEX WLM PAV DATA TABLE

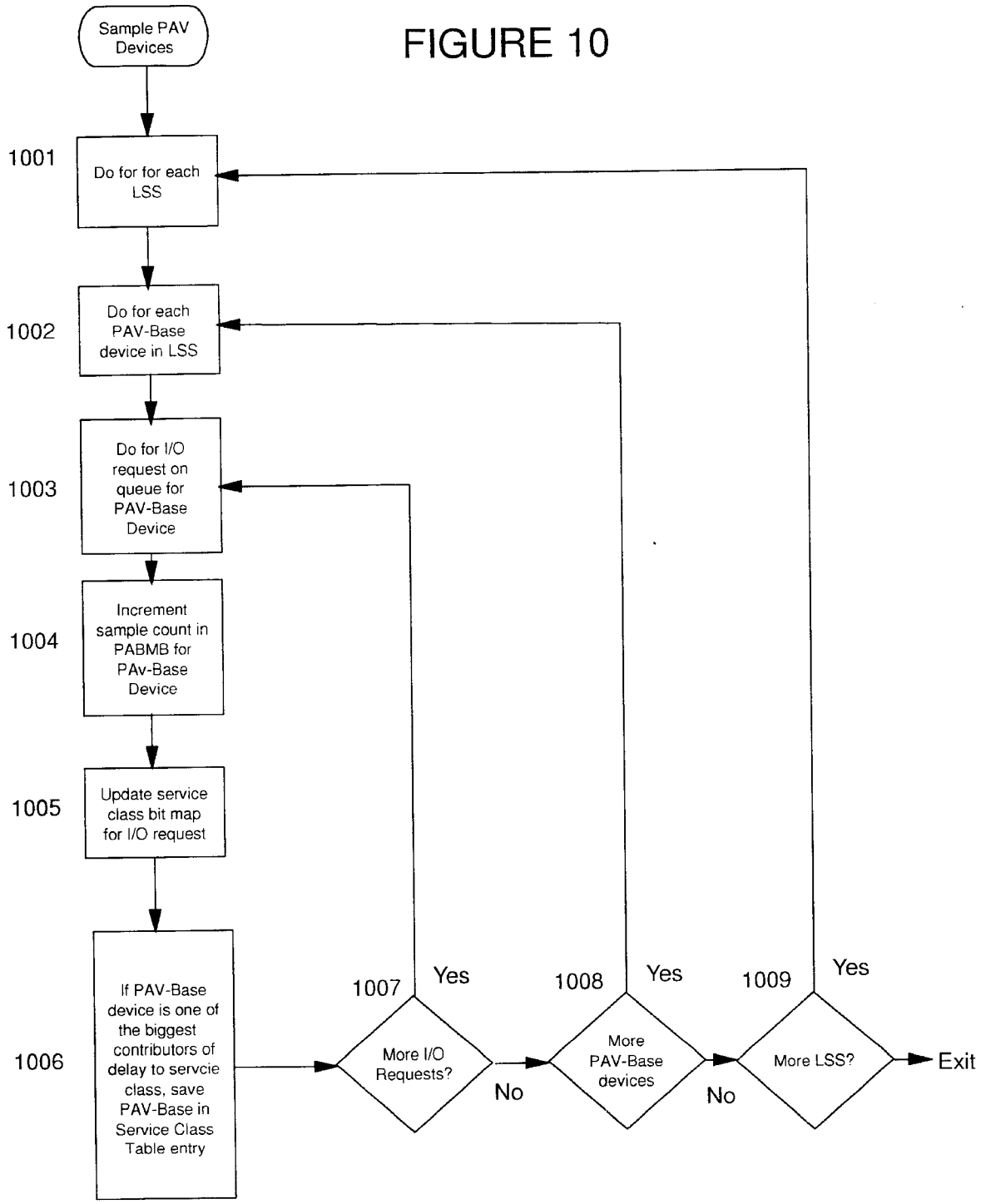

FIGURE 12 - PAV TOKEN

DYNAMIC MANAGEMENT OF ADDRESSES TO AN INPUT/OUTPUT (I/O) DEVICE

BACKGROUND

1. Field of the Invention

The present invention relates to a method and computer program device for managing the assignment of base and alias addresses for an I/O device. In particular, the present invention relates to a method and computer program device utilizing performance data to dynamically manage the allocation of parallel I/O access capabilities enabled by the assignment of base and alias I/O addresses.

2. Description of Related Art

FIG. 1 illustrates a hardware environment of a channel subsystem 2 included in a host system 4 providing communication between CPUs 6a, b and I/O devices 10a, b, c. A storage controller 8 controls access to the I/O devices 10a, b, c. The host system 4 communicates with the storage controller 8 via the channel subsystem 2 and subchannels 14a, b, c therein. The host system 4 includes CPUs 6a, b that contain the sequencing and processing facilities for instruction execution, interruption action, timing functions, initial program loading, and other machine-related functions. The CPUs 4a, b may be host systems. The I/O devices 10a, b, c may be comprised of printers, magnetic-tape units, direct-access-storage devices (DASDs), displays, keyboards, communications controllers, teleprocessing devices, and sensor-based equipment. The storage controller 8 regulates and controls data transfers to the I/O devices 10a, b, c. The storage controller 8 function may be a separate stand alone machine, such as the IBM 3990 Storage Controller, or housed within the I/O device 10a, b, c or within the host system 4. In certain systems, the host system 4 may view the storage controller 8 as a multitude of separate control unit images or logical subsystems (LSSs), wherein each control unit provides access to a particular I/O device 10a, b, c.

The CPUs 6a, b and the channel subsystem 2 may access a main storage 12. Programs and data maintained in the I/O devices 10a, b, c such as storage drives, must be loaded into the main storage 12 before the CPUs 6a, b can process such programs and data. The main storage 12 may include a fast access buffer or cache. I/O operations involve the transfer of data between the main storage 12 and the I/O devices 10a, b, c. The channel subsystem 2 directs the flow of data between the storage controller 8 and the main storage 12. The channel subsystem 2 relieves the CPUs 6a, b of handling I/O operations and permits the CPUs 6a, b to devote processing cycles to other operations while the channel subsystem 2 concurrently handles data transfers. In typical implementations, the CPUs 6a, b, the main storage 12, and the channel subsystem 2 are all located within a single host 4 that is attached to a single storage controller 8, such as the IBM 3990 Storage Controller.

Channel paths 12 provide data communication between the channel subsystem 2 and the storage controller 8. The channel paths 12 may employ a parallel-transmission protocol or a serial-transmission protocol. The storage controller 8 includes control logic to physically access the I/O devices 10a, b, c and control data transfer. In preferred embodiments, multiple channel paths 12 may be dedicated for communication with a particular I/O device 10a, b, c.

A subchannel 14a, b, c is dedicated to each I/O device 10a, b, c accessible to the channel subsystem 2, i. e., there is a one-to-one relationship between subchannels 14a, b, c and I/O devices 10a, b, c. Each subchannel 14a, b, c consists of internal storage and includes information relating the I/O devices 10a, b, c to the channel subsystem 2. The channel subsystem 2 uses the information in the subchannels 14a, b, c to access the I/O devices 10a, b, c. The subchannels 14a, b, c are assigned to the I/O devices 10a, b, c at initialization. The subchannels 14a, b, c maintain information such as the channel command word (CCW), channel-path identifier, device number, etc., concerning operations initiated with respect to the I/O device 10a, b, c represented by the subchannel 14a, b, c. I/O devices 10a, b, c that are attached to the channel subsystem 2 by multiple channel paths 12 may be accessed using any of the available channel paths 12. An I/O device 10a, b, c is addressed by channel-path identifiers (CHPIDs) identifying the path to a device, subchannel numbers identifying the subchannel 14a, b, c associated with the device, and a device number uniquely identifying the I/O device 10a, b, c to the host system 4. The IBM S/390 operating system allows for dynamic-reconnection, wherein the storage controller 8 may select any channel path 12 leading to the host system 4 when logically reconnecting to the channel subsystem 2.

The main storage 12 includes unit control blocks (UCBs) which include information on the subchannels and I/O devices. The CPUs 6a, b may access the UCB information when initiating I/O operations.

The channel subsystem 2 may receive numerous I/O operations from CPUs 6a, b directed toward the I/O devices 10a, b, c. The channel subsystem 2 initiates a channel program which comprises a series of channel commands to access and perform the I/O operation requested by the host system 4. An I/O operation toward a volume operates through the execution of a series of linked channel command words (CCW). The CCW designates the storage area associated with the operation, the action to be taken whenever transfer to or from the area is completed, and other options. A CCW command includes different fields, including: a command code that specifies the operation to be performed, e.g., write, read, read backward, control, sense, sense ID, and transfer in channel; and an address field designating a location in absolute storage, otherwise referred to as a data storage address of where the I/O operations and commands are maintained in main memory 12, and chain command information specifying whether commands are chained together. With each chain of commands, a define extent command may be provided indicating the permissible I/O operations that may be performed and a locate record command indicating the actual I/O operation to be performed. The chain of CCW commands may operate within the defined extent range. A description of these commands is provided in the IBM publication, "IBM 3990/9390 Storage Control Reference," IBM Document no. GA32-0274-04 (Copyright IBM, 1994, 1996), which publication is incorporated herein by reference in its entirety.

A subchannel 14a, b, c establishes an active allegiance for a channel path when active communication is initiated with the I/O device 10a, b, c on the channel path. In current systems, the subchannel 14a, b, c can have an active allegiance to only one channel path at a time. While a subchannel 14a, b, c has an active allegiance on a channel path 12 to an I/O device 10a, b, c, the channel subsystem 2 does not actively communicate with that device on any other channel path. Thus, there is only one path of communication, and hence one channel program, directed toward an I/O device 10a, b, c at a given time even though there may be multiple dynamic channel paths 12 leading to the I/O device 10a, b, c. Although dynamic channel pathing provides multiple paths from the channel subsystem 2 to the storage controller 8, only one of the dynamic paths is used at a time to communicate with the I/O device 10*a, b, c*. The dynamic paths are used to provide an alternative path for reconnecting the storage controller 8 and the I/O device 10*a, b, c* to the host system 4. In preferred embodiments, the storage controller 8 selects the path for reconnection. In the prior art, execution of a channel program for a single host system along multiple paths would likely create device-busy conditions detectable by the channel subsystem and cause unpredictable results.

Thus, with prior art servers employing the channel subsystem architecture of the IBM ESA/390 server and other similar server systems known in the art, a single host system cannot direct concurrent, multiple I/O operations toward the same volume, i. e., I/O device. In the current art, to execute multiple channel programs toward the same I/O device 10*a, b, c*, the channel program operations must be queued and executed serially; multiple channel programs cannot be executed at once toward the same I/O device 10*a, b, c*. Otherwise, if the multiple I/O tasks return data from the same device to a single host, then the host could not relate the data to the completed I/O task because the host cannot distinguish on the basis of the single base address for the target I/O device 10*a, b, c*. Prior art systems are described in the IBM publications "ESA/390 Principles of Operation," IBM document no. SA22-7201-04 (IBM Copyright 1990, 1991, 1993, 1994, 1996, 1997), and U.S. Pat. No. 5,197,069, entitled "Method and System for Detecting and Recovering from Switching Errors," assigned to IBM, which publications and patent are incorporated herein by reference in their entirety.

For the foregoing reasons, there is a need to create and manage parallel access to shared I/O devices.

BRIEF SUMMARY OF THE INVENTION

The present invention is directed to a method of managing parallel access to shared I/O devices, where parallel access is enabled by the use of base and alias addresses to access an I/O device. Parallel access is managed by allocating the alias addresses.

In particular, it is an object of the present invention to utilize performance data to allocate alias addresses.

It is a further object of the present invention to allocate alias addresses in a way designed to improve the efficient utilization of a shared I/O device, by collecting and analyzing performance data relating to the utilization of the shared I/O device.

It is a still further object of the present invention to allocate alias addresses in a way designed to allocate resources to high importance tasks (organized into service classes), by collecting and analyzing data relating to the performance of service classes relative to processing goals assigned to the classes.

It is a still further object of the present invention to utilize multiple sets of performance data, resulting in multiple concurrent alias assignment methods, and to manage contention among the multiple concurrent assignment methods.

It is a further object of the present invention to operate in a multi-host or sysplex environment, by sharing performance data among all hosts within the sysplex and providing methods to manage contention between multiple hosts.

The present invention manages parallel access to an I/O device enabled by the use of base and alias addressing. As noted previously, existing servers employing the channel subsystem architecture of the IBM ESA/390 server and other similar server systems known in the art limit each host image to a single I/O operation to any particular I/O device at any particular time. By assigning to each I/O device a fixed base address and a number of alias addresses, any host image can initiate multiple concurrent I/O requests to the base device by initiating one request to each address (base or alias) associated with the base device. The host image perceives and manages each request as a request to a different I/O device, thereby allowing the requests to execute in parallel. The direct access storage device (DASD) subsystem routes each request to the appropriate I/O device, and processes the requests in parallel to the extent possible. When the DASD subsystem is unable to process requests to a particular device in parallel, the requests are queued in the DASD subsystem. By managing the assignment of alias addresses to base I/O devices, the hosts are able to control the number of concurrent access requests possible for each I/O device. As noted, the total number of concurrent or parallel access requests available for a specific I/O device at any specific time is the total number of addresses (base plus alias) associated with that I/O device at that time.

In one embodiment of the present invention, data related to the performance of each I/O device is collected periodically by the attached host system. This I/O performance data is then analyzed to determine which I/O devices are performing poorly and are thus in need of additional alias addresses. Based on this analysis, the host systems will determine which alias addresses are to be reassigned from a donor device to a receiver device. The host system will issue appropriate instructions to the I/O subsystem (IOS), causing the I/O subsystem to implement the reassignment of the alias address from the specified donor to the specified receiver.

In other embodiments of the present invention, an alias will be reassigned to a receiver only after a determination is made that the reassignment will not have a significant adverse impact. Several methods are employed to make this determination. In one embodiment, alias addresses that are not currently bound to a base address are identified as donors. In another embodiment, performance data is used to identify I/O devices that are performing well, and are thus identified as donors. In a further embodiment, potential donors are identified by analyzing performance data, however an alias will only be assigned away from the donor if the host determines that the device performance will remain above a threshold level after the reassignment.

In another embodiment of the present invention, data related to the performance of service classes is collected periodically by the attached host system. This data is analyzed to identify service classes that are failing to meet their specified performance goals. Performance data is also collected regarding the relative performance of each I/O device. Additional data is collected regarding the utilization of each I/O device by each service class. This data is analyzed to identify I/O devices experiencing poor performance, and to correlate each I/O device to the service class utilizing the I/O device. For each instance where a class fails to meet one or more of its performance goal and the class is utilizing a poorly performing I/O device, the host system attempts to identify a donor device associated with a service class of lesser importance. If such a donor is identified, the host system issues appropriate instructions to the I/O subsystem, causing the I/O subsystem to implement the reassignment of the alias address from the specified donor to the specified receiver.

In a preferred embodiment of the present invention, multiple sets of performance data are collected and analyzed concurrently. Multiple analysis and reassignment methods are run concurrently on each set of performance data. Contention between concurrent reassignment methods is managed with two methods. First, a token is used to serialize alias reassignments, thus insuring that any particular alias can be moved by only one host system and only one reassignment method at any specific instant. Second, time stamping is utilized to limit the frequency with which any specific alias can be reassigned. Where multiple concurrent alias reassignment methods are in operation, one of the methods is designated as a dominant method, taking precedence over other subordinate methods. The dominant method is run more frequently than any subordinate methods. As the dominant method reassigns an alias, the base device associated with the reassigned alias is given a time stamp indicating the time at which the move occurred. Reassignment rules require a minimum "wait" time before this base can have aliases added or removed, where the wait time exceeds the time between the reassignment by the dominant method and the time of analysis by the subordinate method. By thus utilizing a time stamp, the subordinate method will perceive an alias to be unavailable for reassignment if that alias is associated with a base address which was previously a donor or receiver of an alias during most recent cycle of the dominant method.

In preferred embodiments of the present invention, the environment is a multi-host or sysplex environment. In particular, this environment requires sharing of all performance data among all hosts within the sysplex, and methods to manage contention among the hosts.

In preferred embodiments of the present invention, the I/O device is a logical volume included in a storage device comprised of multiple logical volumes, and the base and alias addresses address logical volumes. In particular, for these embodiments data is collected regarding the relative performance of each logical volume (LV) comprising the I/O device.

BRIEF DESCRIPTION OF THE DRAWINGS

These and other features, aspects, and advantages of the present invention will become better understood with regard to the following description, appended claims, and accompanying drawings where:

FIG. 5 illustrates the local parallel access volume (PAV) table, in accordance with preferred embodiments of the present invention;

FIG. 6 illustrates the sysplex PAV table, in accordance with preferred embodiments of the present invention;

FIG. 10 illustrates a sampling method used to associate I/O devices with service classes, in accordance with preferred embodiments of the present invention;

DETAILED DESCRIPTION OF THE INVENTION

The present invention builds upon two concepts: the use of alias addresses to enable parallel access to an I/O device, and workload management. As a preliminary to a detailed discussion of the present invention, a few introductory remarks are in order regarding these concepts.

Figure 1:
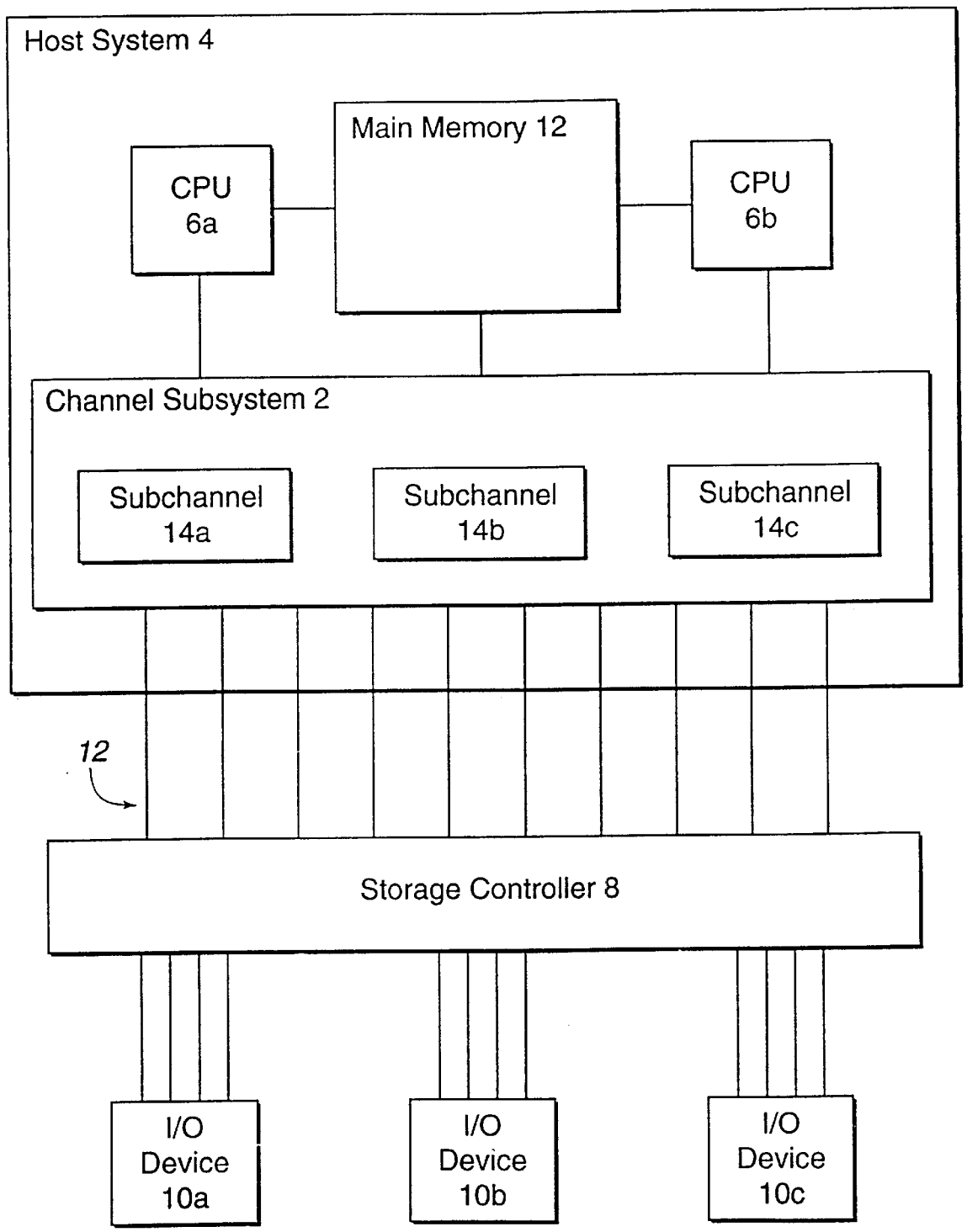
FIG. 1 illustrates a computing environment as known in the art.
Figure 2:
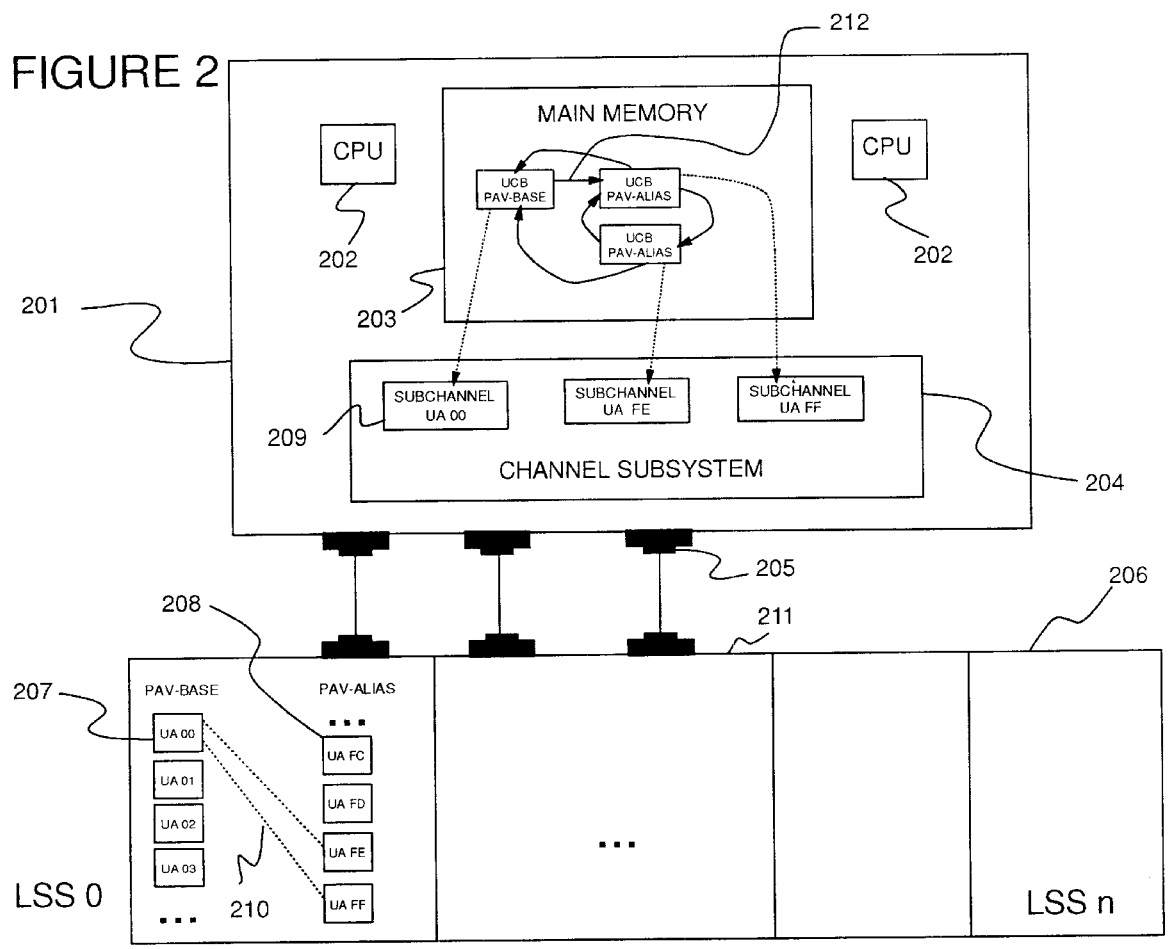
FIG. 2 illustrates the use of alias addresses to provide parallel access to an I/O device, in accordance with preferred embodiments of the present invention.

FIG. 2 illustrates the use of alias addresses to provide parallel access to an input/output (I/O) device, in particular a direct access storage device (DASD) of a preferred embodiment of the present invention. The IBM Enterprise Storage Server (ESS) (211) DASD subsystem allows the customer to logically partition the ESS into multiple logical storage subsystems (LSSs) (206), up to 16 when attached to the host using the ESCON (Enterprise System Connection) channel to control unit I/O interface architecture. Each of these 16 LSSs can be defined to have up to 256 unit addresses, each capable of being addressed by a host operating system through a subchannel (209) communicating over an ESCON channel (205). Each unit address can be defined to either be a Parallel Access Volume (PAV) base unit address (207) or a PAV-alias unit address (208). For each PAV-base unit address (207) the customer decides the total amount of storage that is to be assigned to that logical volume (LV). Each PAV-alias address (208) is assigned to a specific PAV-base address (207). For devices that are logically online, the host operating system determines which PAV-alias devices are associated with which PAV-base devices (212) by examining the data contained in the device self description data and binding the PAV-base to the PAV-alias UCBs (Unit Control Block, which represents a device to the operating system). PAV-base devices that are logically offline do not have PAV-alias devices bound to them. The PAV-alias devices that are not bound to a PAV-base in the operating system are called "unbound aliases."

PAV-alias addresses may be reassigned to different PAV-base unit addresses within the same LSS in one of two ways. The customer can use the customization interface to delete a PAV-alias definition and then re-add that PAV-alias unit address with a different PAV-base assignment. Alternatively, the host can issue a channel command word (CCW) to a PAV-alias identifying a new PAV-base to which the PAV-alias should be associated. PAV-alias unit addresses are always defined to be associated with a specific PAV-base (LV)(210). They cannot exist in an LSS without being associated with a PAV-base unit address. The PAV-base unit address (207) and all its associated PAV-alias unit addresses (208) together provide the host with a physical communication path with the LV. Furthermore, the host can start an I/O operation to a LV over any one of the unit addresses for that LV (PAV-base or PAV-alias). If the host needs to start multiple I/O requests to the same logical volume at the same time, it can do so over all the PAV-alias and PAV-base unit addresses, one I/O request to each.

Detailed descriptions of the use of alias addresses to perform I/O operations, and the ability to dynamically reassign alias addresses, are disclosed in the following commonly owned pending patent applications, incorporated herein by reference:

"System For Accessing An Input/Output Device Using Multiple Addresses," by Brent C. Beardsley, James L. Iskiyan, James McIlvain, Phillip R. Mills, Michael A. Paulsen, William G. Thompson, and Harry M. Yudenfriend, Ser. No. 09/168,017;

"Method and System For Dynamically Assigning Addresses To An Input/Output Device," by Brent C. Beardsley, Allan S. Merritt, Michael A. Paulsen, and Harry M. Yudenfriend, Ser. No. 09/167,782;

"Method and System for Reassigning Addresses To An Input/Output Device," by Brent C. Beardsley, Allan S. Merritt, Michael A. Paulsen, and Harry M. Yudenfriend, Ser. No. 09/167,603;

"Defining Characteristics Between Processing Systems," by Brent C. Beardsley, John T. Flynn, Michael A. Paulsen, and Harry M. Yudenfriend, Ser. No. 09/167,605;

Of the above pending patent applications, Ser. No. 09/168,017 discloses a method and apparatus for performing I/O operations by associating alias addresses with I/O devices, Ser. No. 09/167,603 discloses a method and apparatus for reassigning alias addresses, and Ser. No. 09/167,782 discloses a method and apparatus for dynamically assigning alias addresses to I/O devices, Ser. No. 09/167,605 discloses a method for the operating system to synchronize its capabilities with the subsystem.

One or more embodiments of the present invention utilize workload management principles to provide a performance measurement on which to base the reassignment of device alias addresses. Workload management is a concept whereby units of work that are managed by an operating system are organized into classes. These classes are referred to as service classes or goal classes. Service classes are provided system resources in accordance with how well they are meeting predefined goals. In general, workload management concepts involve the reassignment of resources from a donor class to a receiver class, if the improvement in performance of the receiver class resulting from such a reassignment exceeds the degradation in performance of the donor class, i.e., there is a net positive effect in performance as determined by predefined performance criteria. Workload management of this type differs from run-of-the-mill resource management performed by most operating systems in that the assignment of resources is determined not only by its effect on the work units to which the resources are reassigned, but also by its effect on the work units from which they are taken.

Workload managers of this general type are disclosed in the following commonly owned patents, pending patent applications, and non-patent publications, incorporated herein by reference:

U.S. Pat. No. 5,974,462 to J. D. Aman et al, entitled-"Method and Apparatus for Controlling The Number of Servers In A Client/Server System";

U.S. Pat. No. 5,504,894 to D. F. Ferguson et al., entitled-"Workload Manager for Achieving Transaction Class Response Time Goals in a Multiprocessing System";

U.S. Pat. No. 5,473,773 to J. D. Aman et al., entitled"Apparatus and Method for Managing a Data Processing System Workload According to Two or More Distinct Processing Goals";

U.S. Pat. No. 5,537,542 to C. K. Eilert et al., entitled"Apparatus and Method for Managing a Server Workload According to Client Performance Goals in a Client/Server Data Processing System";

U.S. Pat. No. 5,603,029, to J. D. Aman et al., entitled-"System of Assigning Work Requests Based on Classifying into an Eligible Class Where the Criteria Is Goal Oriented and Capacity Information is Available";

U.S. Pat. No. 5,675,739, to C. K. Eilert et al., entitled"Apparatus and Method for Managing a Distributed Data Processing System Workload According to a Plurality of Distinct Processing Goal Types";

U.S. application Ser. No. 08/848,763, filed May 1, 1997 which is a continuation of Ser. No. 08/383,042, filed Feb. 3, 1995 (abandoned), of C. K. Eilert et al., entitled "Multi-System Capping";

U.S. application Ser. No. 08/488,374, filed Jun. 7, 1995, of J. D. Aman et al., entitled "Apparatus and Accompanying Method for Assigning Session Requests in a Multi-Server Sysplex Environment";

MVS Planning: Workload Management, IBM publication GC28-1761-00, 1996;

MVS Programming: Workload Management Services, IBM publication GC28-1773-00, 1996.

Of the patents and applications, U.S. Pat. Nos. 5,504,894 and 5,473,773 disclose basic workload management systems; U.S. Pat. No. 5,537,542 discloses a particular application of the workload management system of U.S. Pat. No. 5,473,773 to client/server systems; U.S. Pat. No. 5,675,739 and application Ser. No. 08/848,763 which is a continuation of application Ser. No. 08/383,042 (abandoned) disclose particular applications of the workload management system of U.S. Pat. No. 5,473,773 to multiple interconnected systems; U.S. Pat. No. 5,603,029 relates to the assignment of work requests in a multi-system complex ("sysplex"); and application Ser. No. 08/488,374 relates to the assignment of session requests in such a complex. U.S. Pat. No. 5,675,739 discloses the application of workload management methods in a multi-host environment. The two non-patent publications describe an implementation of workload management in the IBM® OS/390™ (formerly MVS®) operating system.

In particular, U.S. Pat. Nos. 5,473,773 and 5,675,739 disclose for single and multi-host environments, respectively, the basic method of identifying service classes that are not meeting performance goals. The workload manager determines for each service class whether or not that service class is meetings its performance goals. This determination is done by calculating a metric called the performance index (PI). If the PI is less than one, the service class is exceeding its goal. If the PI equals one, the service class is exactly meeting its goal. Finally, if the PI is greater than one, the service class is not achieving its goal. One embodiment of the present invention, the goal adjustment method, utilizes the performance index (PI) to determine if a service class is not meeting its goal, by checking if the service class has a PI greater than one.

Features of preferred embodiments of the present invention are disclosed in the following commonly owned nonpatent publications, incorporated herein by reference:

StorWatch ESS Expert Hands-On Guide, IBM publication SG24-6102-00, 2000,

IBM Enterprise Storage Server Performance Monitoring and Tuning Guide, IBM publication SG24-5656-00, 2000, Implementing the Enterprise Storage Server in Your Environment, IBM publication SG24-5420-00, 1999, IBM Enterprise Storage Server. IBM publication SG24-5465-00, 1999, DFSMS/MVS Software Support for IBM Enterprise Storage Server IBM publication SC26-7318-00, 1999, IBM Enterprise Storage Server 2105 Models E10/E20 Service Guide, IBM publication SY27-7605-00, 1999, IBM Enterprise Storage Server System/390 Command Reference 2105 Models E10 and E20, IBM publication SC26-7298-00, 1999, IBM Enterprise Storage Server User's Guide 2105 Models E10 and E20, IBM publication SC26-7295-00, 1999, IBM Enterprise Storage Server Introduction and Planning Guide 2105 Models E10 and E20, IBM publication GC26-7294-01, 1999, IBM Enterprise Storage Server Host Systems Attachment Guide 2105 Models E10 and E20, IBM publication SC26-7296-00, 1999.

A Preferred Embodiment: Dynamic Management of Parallel Access Volumes (PAVs)

While applicable to other I/O device types, preferred embodiments of the present invention will be illustrated for the case where the I/O device is a logical volume (LV), several of which comprise a direct access storage device (DASD) subsystem. Additionally, while the present invention is applicable in a single host environment, preferred embodiments of the present invention will be illustrated in a multi-host or sysplex environment. Further, preferred embodiments of the present invention utilize a workload manager.

Figure 3:
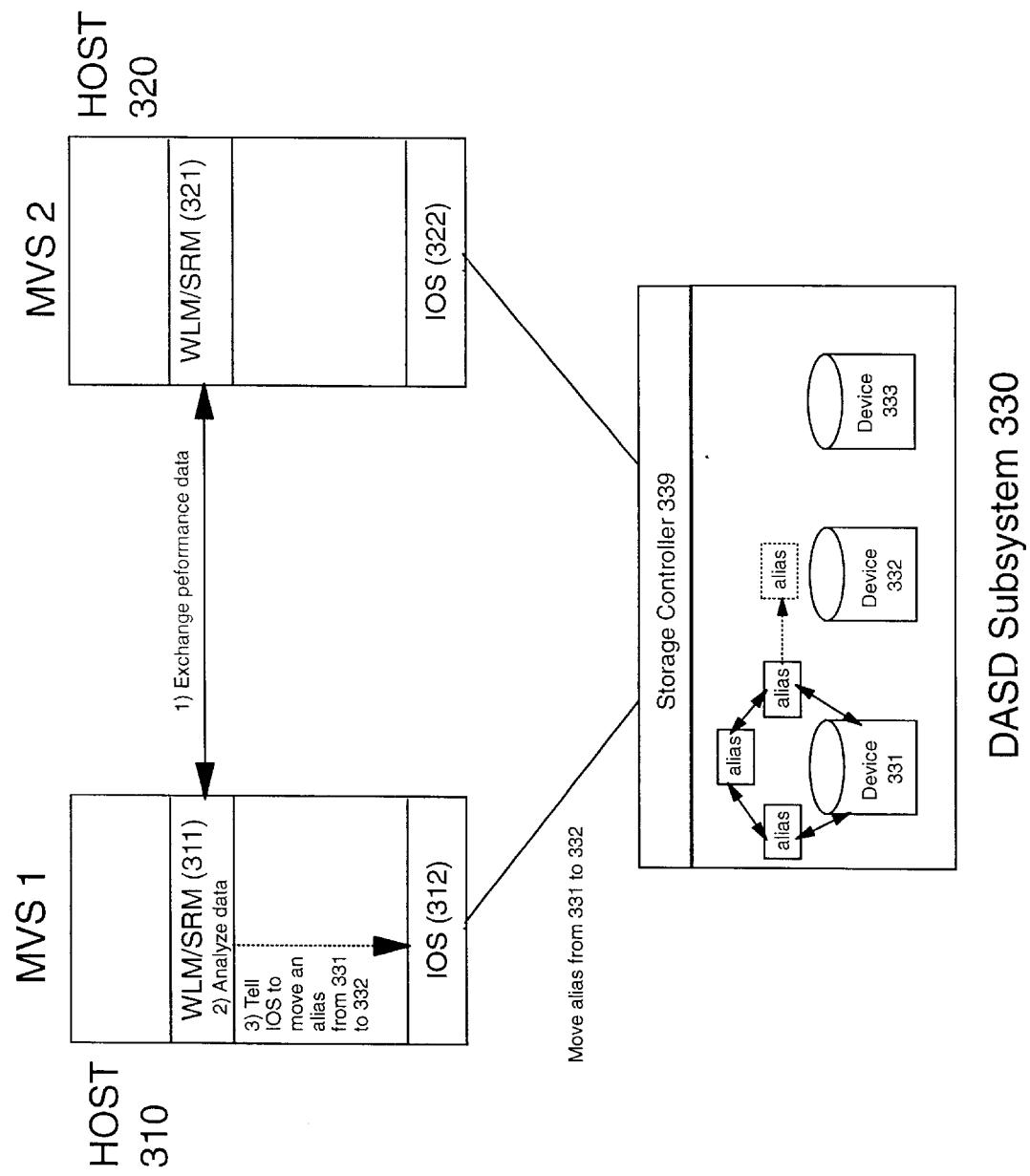
FIG. 3 illustrates the basic environment and alias reassignment method, in accordance with preferred embodiments of the present invention.

A preferred embodiment of the present invention can best be understood by reference to FIG. 3, showing a shared I/O subsystem containing multiple direct access storage (DASD) devices. For the purposes of illustration, connection paths have been simplified. Host systems 310 and 320 share access to DASD subsystem 330. Resident on host systems 310 and 320 is a workload manager (WLM) and system resource manager (SRM), 311 and 321, and I/O Subsystems (IOS) 312 and 322, respectively. DASD subsystem 330 is comprised of multiple devices or logical volumes (LV), 331, 332, and 333. Storage controller 339, shown integrated into the DASD subsystem 330, may optionally be a separate unit. The WLM and SRM components (311 and 321) of hosts 310 and 320 generate and share relevant performance data. This performance data may be data regarding the performance of LVs 331, 332, and 333, or data regarding the performance of system work units relative to their associated performance goals, or both types of data. Preferred embodiments of the present invention utilize both types of data. Associated with each LV is a base address or UCB, and potentially one or more alias addresses or alias UCBs. As noted previously, the total number of parallel I/O operations possible for any given LV is equal to the total number of addresses (base plus alias) assigned to the LV. As shown in FIG. 3, device 331 is initially assigned three alias addresses, enabling a total of four concurrent I/O requests to device 331. Devices 332 and 333 have initially been assigned zero alias addresses, therefore hosts 310 and 320 may issue only a single I/O request to these devices at any time.

As illustrated in FIG. 3, a preferred embodiment of the present invention involves three basic steps. First, WLM 311 of host 310 gathers relevant performance data. In the sysplex environment of FIG. 3, WLM 321 of Host 320 also gathers relevant performance data, and Hosts 310 and 320 each share the data thus gathered with the other Host, providing each host with a sysplex-wide view of the relevant performance data. In the second step shown in FIG. 3, WLM 311 analyzes the sysplex-wide performance data, and determines that improved performance would be obtained by increasing the parallel access capability of device 332. WLM determines, in other words, that an alias address should be assigned to device 332. WLM 311 instructs IOS 312 to move an alias from device 331 to device 332. IOS 312, in turn, communicates with storage controller 339 to implement the alias move.

The following discussion will provide further details of preferred embodiments, specifically regarding the performance data collected, alias reassignment methods, and contention management methods. Those skilled in the art will recognize that other embodiments, or additional embodiments, are possible without departing from the spirit and scope of the present invention.

Definitions

The following terminology will be used throughout the remainder of this specification. "Average service time" is defined as the average length of time required for an average input/output (I/O) request to complete execution, once the request has been sent to the channel subsystem for execution. "Measurement interval" is defined as the time over which the average service time is calculated: in preferred embodiments, a measurement interval of approximately 10 seconds is used. "Policy adjustment code" is defined as the portion of the operating system that executes the methods of the present invention: collection of performance data, the efficiency adjustment method, and the goal based adjustment method. "Policy interval" (or PA interval) is defined as the time interval in which the policy adjustment code is run: in preferred embodiments, a PA interval of approximately 10 seconds is used.

Data Structures

Figure 4:
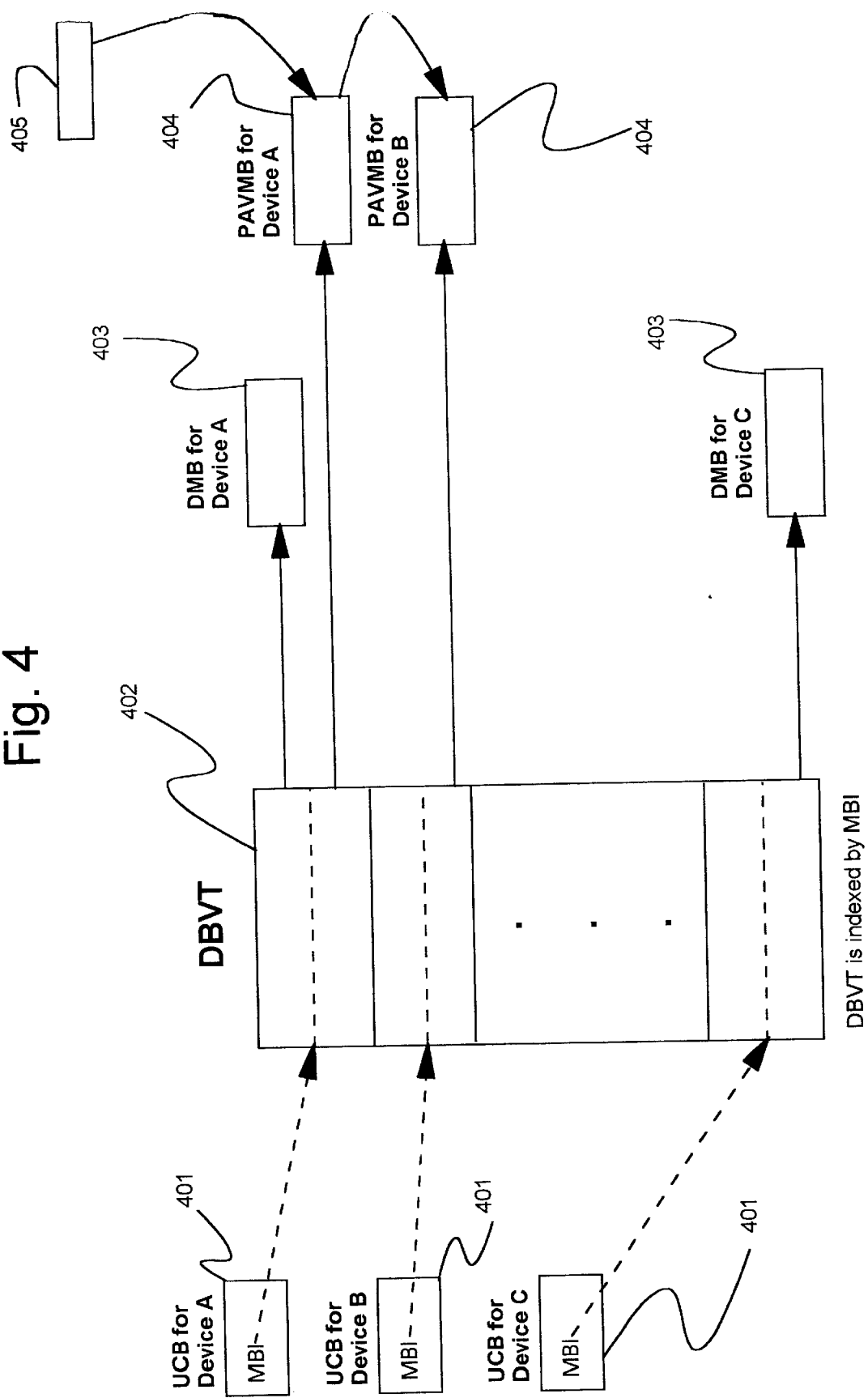
FIG. 4 illustrates a device block vector table used in generating performance data, in accordance with preferred embodiments of the present invention.
Figure 7A:
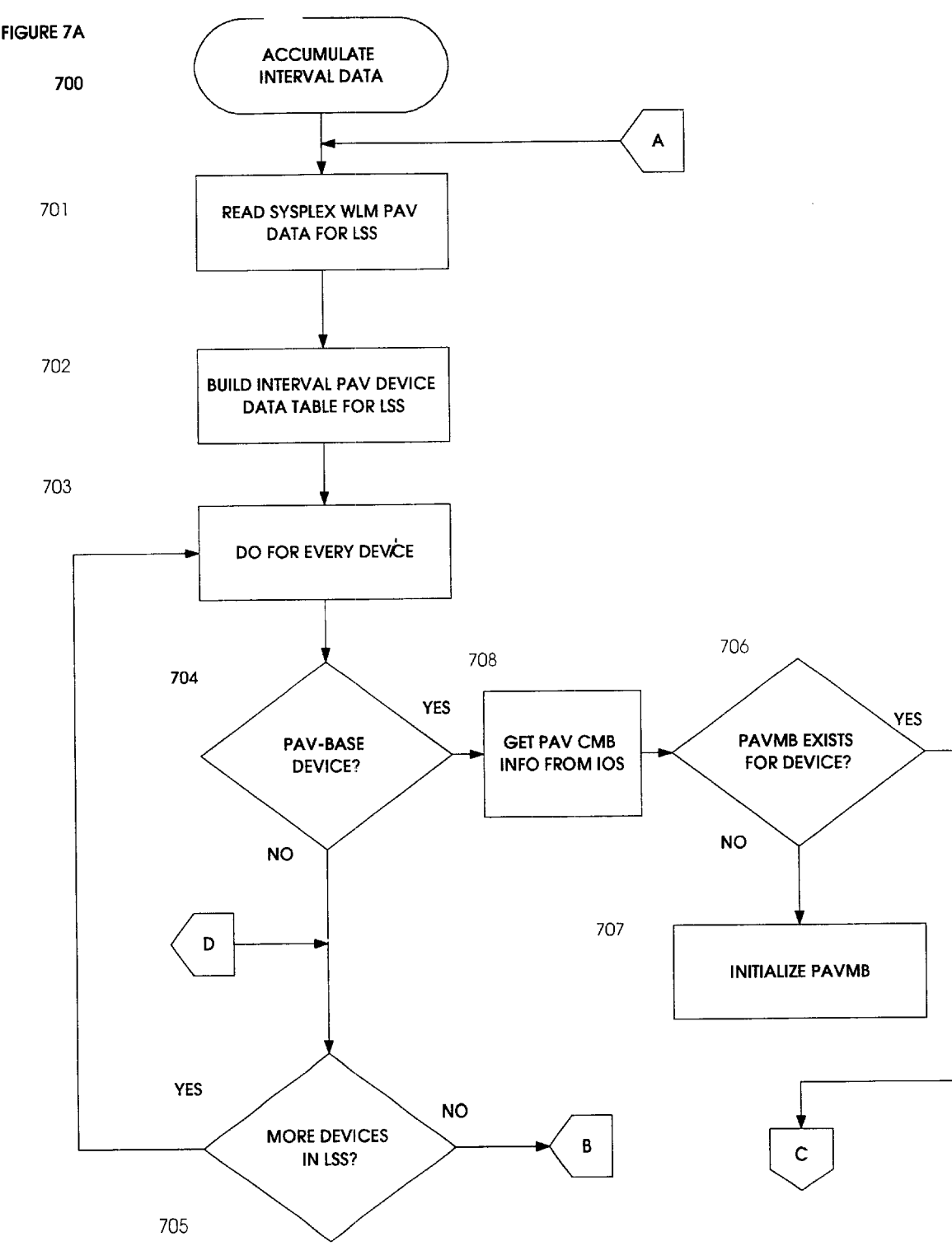
FIGS. 7a, b, and c illustrate the method steps of accumulating device performance data, in accordance with preferred embodiments of the present invention.
Figure 7B:
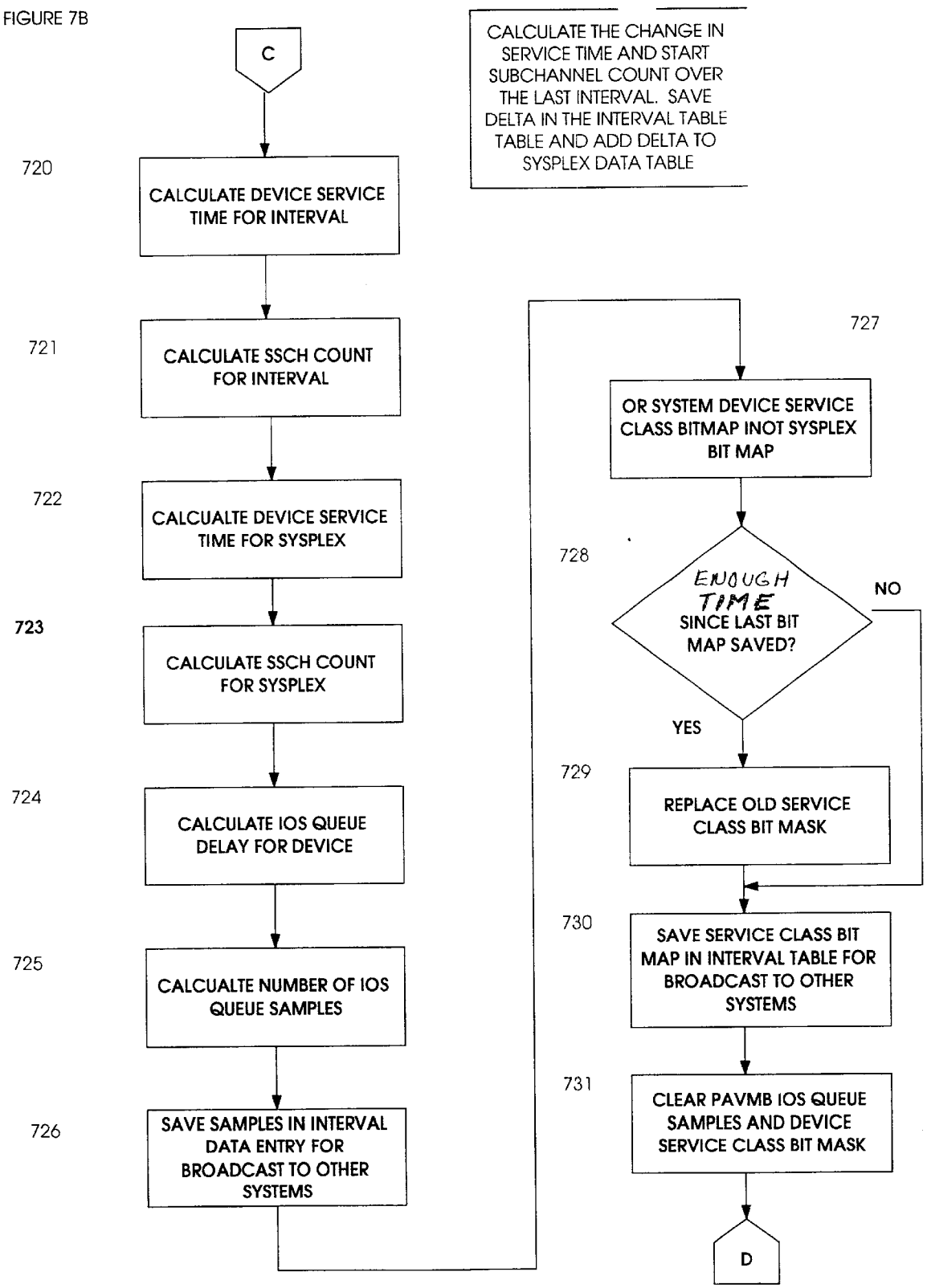
Figure 7C:
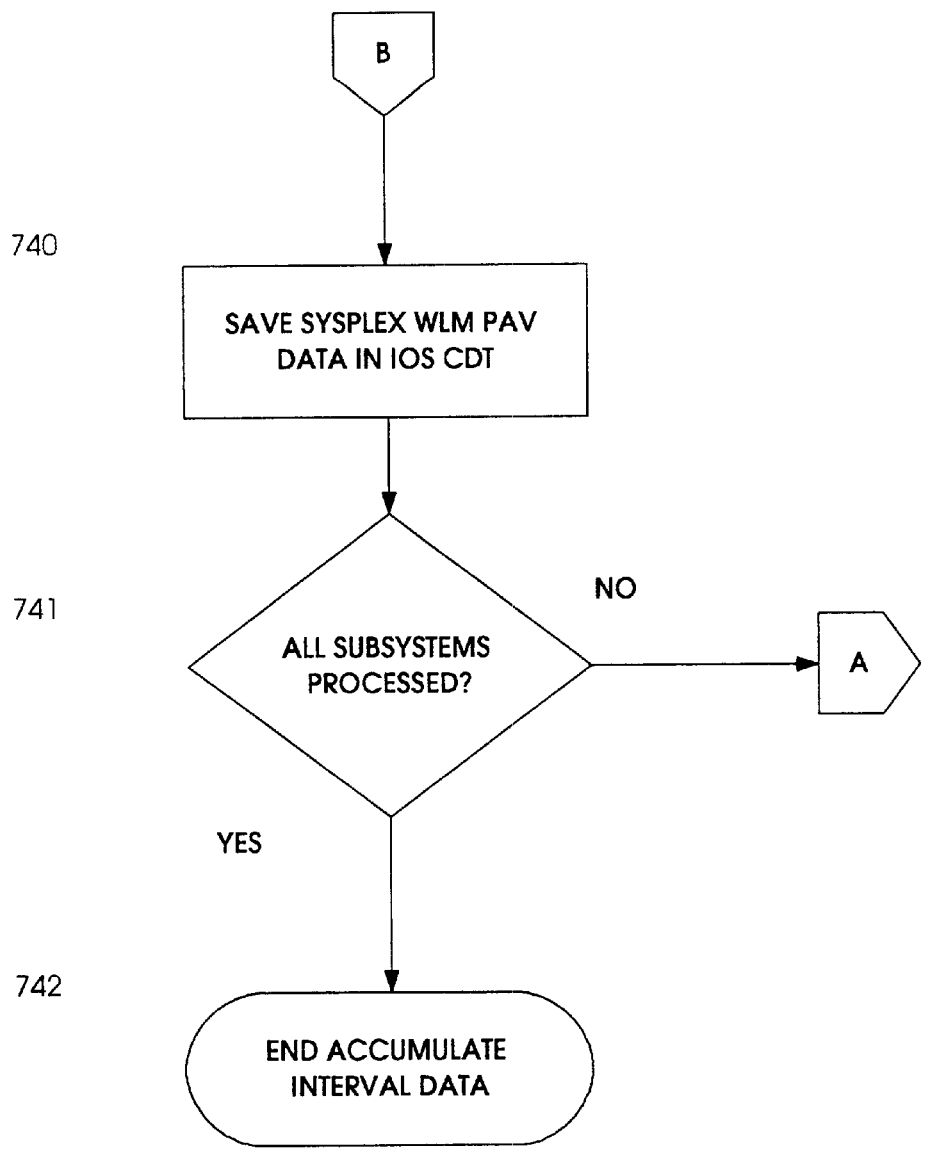
Figure 8:
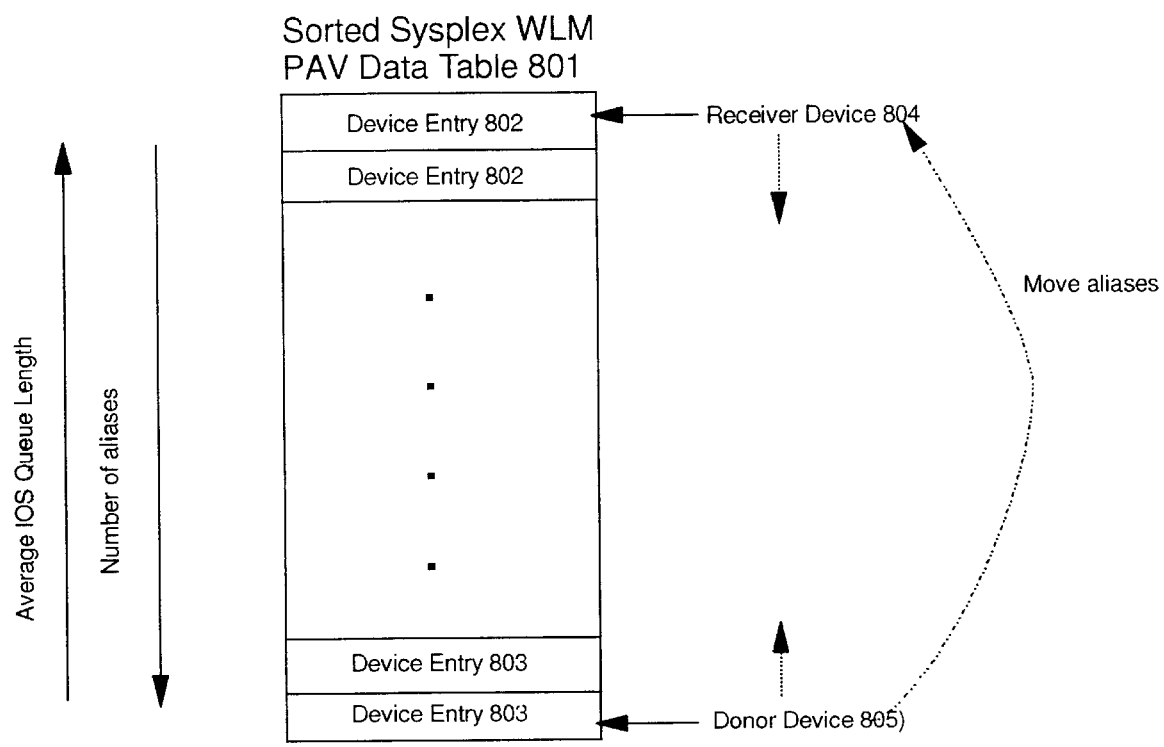
FIG. 8 illustrates analysis of the sysplex PAV table data, in accordance with preferred embodiments of the present invention.

Referring to FIG. 4, in order to calculate average service time for I/O requests to a PAV device over a measurement interval the System Resource Manager component (SRM) needs a place to save, at the beginning of the measurement interval, the Channel Measurement Block (CMB) fields that are part of the average service time calculation. These base values for the CMB fields then allow SRM to calculate the increase in the CMB fields over the measurement interval. The data structure of a preferred embodiment of the present invention is made up of the DBVT (device block vector table) (402) and the DMB (device measurement block) (403). The DBVT is an array indexed by a device's MBI (subchannel measurement block index, which is contained in the device Unit Control Block, UCB, which exists to represent each device in the system) (401). Each entry in the DBVT is either zero or points to a DMB. The DMB (403) contains performance data for the device. A DMB (403) is obtained when the device is involved in a device selection decision by SRM and is freed when the device is varied off-line.

To track the data necessary for alias management, the DBVT (402) contains a pointer to a second control block, the PAV Measurement Block (PAVMB) (404). The PAVMBs (404) are queued together, single threaded, single headed (405). The PAVMB (404) contains the base CMB value for the average service time calculation for the device. A PAVMB (404) is obtained the first time that SRM sees that the device is PAV-capable and freed when the device goes off-line.

Because the PAVMB (404) can be quickly accessed through a device's MBI (401), sampling will also save its PAV related data in the PAVMB (404). This includes the device's IOS queue delay samples and the device service class bitmap.

The PAVMB contains the following data: Service Time: Base total service time for the device including all its aliases; SSC: Base SSC count for the device including all its aliases; IOS_Q_Samp: IOS queue samples attributed to the device over the last policy interval; Samp_Cnt: Number of times IOS queue was sampled over the last policy interval; Device/SC Bitmap: Device service class bitmap for the device; MBI: Device's MBI.

Local PAV Table

The local PAV table is a table of information that WLM/SRM keeps about each device in a subsystem. This data is only kept while the policy adjustment code is running so WLM/SRM does not have to worry about dynamic I/O changes affecting the configuration of a subsystem. The table is rebuilt every policy interval. The data kept is just for the local system. This is also the data that must be broadcast to all other systems in the sysplex to build the sysplex view. During the policy interval the above data is maintained in the table Interval_PAV_Device_Data.

The Interval_PAV_Device_Data has a header with the following info: Subsystem ID: The 28 byte word wide unique id of the subsystem (Token NED) (521); SubSys_Local_Update_Time: Time the efficiency adjustment method was last run for this subsystem locally (522).

The rest of the Interval_PAV_Device table is a table indexed by device unit address with the following structure: IOS Queue Sample (523) is the count IOS queue delay samples for the device over the last policy adjustment interval on the local system; Queue Sample Count (524) is the number of time the IOS queue was sampled; Interval Service Time (525) is the increase in combined CMB service time for the device over the policy adjustment interval; Interval Start Subchannel Count (526) is the increase in the start subchannel count for the device on the local system over the last PA interval; Device/SC Bitmap (527) is the service class bitmap for the device; Flags is a flag byte (528). It includes a flag byte indicating whether the device is defined to support dynamic alias tuning.

Sysplex PAV Table

In a multi-host or sysplex environment, any adjustment made to the number of aliases for a particular PAV device may impact any other host within the sysplex that is using the device. In such an environment, therefore, the adjustment methods running in any host must base their assignment decisions on a sysplex-wide view of performance data.

For this reason, a table of information is kept by IOS for each device in a subsystem. The data is sysplex wide. This table contains the data that drives both the efficiency and the goal based adjustment mechanisms. From the service time and start subchannel count fields an average service time for the device across the sysplex can be calculated. From the IOS Q samp and Q Samp count fields an average queue length across the sysplex can be calculated. The device/service class bitmaps give a sysplex view of the service classes using each device.

The Sysplex_WLM_PAV_Data has a header with the following info: Subsystem ED: The 28 byte word wide unique id of the subsystem (Token NED); SubSys_Local_Update Time: Time the efficiency method was last run for this subsystem locally; SubSys_Remote-Update_Time: Time the efficiency method was last run for this subsystem on a remote system.

The rest of the Sysplex_WLM_PAV_Data table is a table indexed by device unit address with the following structure. There is one entry for each base device and unbound alias in the subsystem. The Device Number (601) is the device number set by IOS; Int Service Time (602) is total CMB service time for the device and all its aliases over the last measurement interval across the sysplex (set by SRM); Int SSCH (603) is the total start subchannel count over the last measurement interval across the sysplex (set by SRM); IOS Queue Sample (604) is the count of IOS queue delay samples over the last measurement interval across the sysplex (set by SRM); Queue Sample Count (605) is the count of number of times IOS queue was sampled over last measurement interval. (IOS Q Samps)/(Q Samp Cnt)= average queue length (set by SRM); New Device/SC Bitmap (606) is the most recent bitmap of service classes using the device across the sysplex. A service class index (1–100) maps to a bit position in this bitmap (set by SRM); Old Device/SC Bitmap (607) is the old version of the bitmap of service classes using the device.

ORing the new and old bitmaps provides a long term view of which service classes are using the device. WLM/SRM periodically replaces the old bitmap with the new and clear the new bitmap to age the data (set by SRM); Number of aliases (608) is the number of alias currently assigned (set by IOS); Token (609) is the PAV token for the device used to serialize alias moves (set by IOS); Update Time Stamp (610) is the time an alias was last taken from or added to this device (set by IOS); MBI (611) is the channel measurement block index for the device (set by IOS); Flags (612) is a flag byte containing state information about the device. This state information includes whether the device supports dynamic alias tuning and whether the device is an unbound alias.

Collection of Performance Data

At the beginning of the PA interval (700), SRM updates the Sysplex WLM PAV Data table for each subsystem known on the local system with recent data for the devices in the subsystem. For each entry in the Sysplex WLM PAV Data table (703), SRM adds in the CMB service time accumulated by the device (708) over the last policy interval (720, 721), the start subchannel count over the last policy interval (722, 723), and the IOS queue delay samples collected over the last policy interval (724, 725). SRM also updates the sysplex device service class bitmap with the local bitmap from the last policy adjustment interval (727).

At the end of the PA interval each system will broadcast the Interval_PAV_Device_Data table for each subsystem to every other goal mode system in the sysplex. Each goal mode system receives the Interval_PAV_Device_Data tables broadcast by the other goal mode system in the sysplex, merging the received tables into a sysplex PAV table.

Data Analysis and Adjustments

As previously noted, preferred embodiments of the present invention utilize various performance measures to assign alias addresses, in order to positively impact the performance measures. Two preferred embodiments will be described, one intended to improve the efficient utilization of system I/O resources, and the other intended to improve the performance of important service classes. Other embodiments are possible, in keeping with the basic spirit of the present invention.

Efficiency Analysis

The basic job of the efficiency adjustment method (900) is to move aliases from PAV-devices that obviously have more aliases than they need to PAV-devices that are experiencing IOS queue delay. The adjustment method is run fairly infrequently; in preferred embodiments this method is run approximately once every three minutes on a given system, and no more than once per minute across the sysplex (902).

To process a subsystem the efficiency adjustment method sorts (904) the device entries (802, 803) in the subsystem's Sysplex_—WLM_PAV_Data table (801) in descending order of average IOS queue length. Within ties on queue length, the order is ascending order of number of aliases owned by the device. Devices on the high IOS queue length end of the table are potential receivers of additional aliases (802) and devices on the low IOS queue length end of the table are potential donors (803). Unbound aliases are at the very end of the low IOS queue length end of the table (801). Unbound aliases are first choice as donors since they are associated with off-line devices.

In preferred embodiments, the adjustment method attempts to move one alias from a donor to a receiver only if taking the alias from the donor does not cause any significant increase in queue delay for the donor device (Forumula 1). An alias is only taken from a donor device if this action will not result in a significant increase in queuing for the device (916). However the more aliases associated with a device, the higher the device utilization can be without an increase in queuing. The following table illustrates the basic relationship.

| # of aliases | Acceptable utilization |
| --- | --- |
| 1 | 20% |
| 2 | 35% |
| 3 | 47% |

This table shows that in order to take a donor device down to 1 alias, the projected utilization must be less than or equal to 20%. If the action would take the donor down 2 aliases, the projected utilization must be less than or equal to 35%, etc.

The table can be approximated by the formula:

$$\frac{Utilization}{A} < 0.1 \quad \text{(Formula 1)}$$

Where:
A=Number of alias's before the change.
Utilization can be calculated with the formula:

$$\frac{(Total\ Service\ Time\ over\ interval)}{(Interval\ length) * A}$$

Therefore the test to decide if an alias move will not have a significant impact is:

$$\frac{(Total\ Service\ Time\ Over\ interval)}{(Interval\ length) * A^2}$$

Goal Analysis

As previously noted, the workload manager determines for a service class whether or not that service class is meetings its goal. This determination is done by calculating a metric called the performance index (PI). If the PI<1.0, the service class is doing better than its goal. If the PI=1.0, the service class is exactly meeting its goal. Finally if the PI >1.0, the service class is not achieving its goal. The goal adjustment method determines if a service class is not meeting its goal, by checking if the service class has a PI>1.0.

In order to reassign alias addresses to appropriate service classes, a relationship must be established between I/O devices and the service classes using those devices.

Association of PAV Devices to Service Classes: Sampling

To support the goal based adjustment of aliases, it is desirable to have an efficient mechanism to identify the service classes of the work that is using each PAV-device. A bitmap is kept with each PAV-device that identifies the service classes using the device. Each bit position in this bitmap corresponds to a service class index. SRM's sampler updates the bitmap for a PAV-device as it samples the IOS queue for the device.

FIG. 10 shows the logic flow for sampling the PAV-Base device I/O request queues. The sampling logic loops through each available LSS (1001). For each LSS it loops through each PAV-Base device (1002) and for each PAV-Base device, its loops through each I/O request on the PAV-Base device's I/O request queue (1003). For each I/O request on the queue the following processing is done: Increment the sample count in the PAVMB for the PAV-Base device (1004); Turn on the bit in the PAVMB service class bit map for the service class that the I/O request belongs to (1005). Each service class has a unique ID which is used to determine which bit in the service class bit map represents a specific service class. This unique ID is saved in the service class table entry; If the PAV-Base device is one of 3 three devices causing the most delay to the I/O request's service class, save the PAV-Base device number in the service class table entry and update the count of samples seen for this PAV-Base device in the service class table entry (1006).

Managing to Performance Goals

The managing for efficiency mechanism will be sufficient in many cases to optimize use of aliases in a DASD subsystem. However, one case the efficiency mechanism will not handle is taking aliases from a highly utilized device being used only by low importance work and giving these aliases to a highly utilized device that is delaying important work. In this case the goal based adjustment method will decide to move enough aliases from the device being accessed by lower importance work to the device being accessed by the higher importance work to eliminate the higher importance work's IOS queue delay.

In preferred embodiments, the goal based mechanism (1100) runs approximately once per minute. It checks each service class in importance order looking for a service class with a period missing goals and experiencing a significant (10 percent) amount of IOS queue delay (1101, 1102, 1103). For each such class (1105) an attempt is made to find additional aliases to move to the devices contributing the most IOS queue delay to the class. The adjustment method analyzes the devices in order of highest to lowest IOS queue delay being caused to the potential receiver class (1106, 1107, 1108). A device must be causing significant delay to the receiver to be considered for additional aliases. A device is considered to be causing significant delay to a class if a request is on the queue for the device on behalf of the class at least 10 percent of the time during the period since the goal method was most recently run, or approximately one minute. For each of these devices the adjustment method attempts to find a donor device from which to take an alias. The adjustment method reads the PAV device data table for the subsystem of which the potential donor device is a part (1109). The table is sorted (1110) in descending order of average IOS queue length. With ties at queue length, the sort order is in ascending order-of number of aliases assigned to the device. Unbound aliases are placed at the very end of the low IOS queue length end of the table. This is the same sort order as used by the efficiency adjustment method. The search for donors (1111, 1115) is also the same order as used by the efficiency adjustment method.

If the potential donor device (1112) is an unbound alias, the unbound alias is moved to the receiver (1113) and the adjustment method exits (1104). If the potential donor device is not an unbound alias and has at least one alias (1114) and it has been long enough since the last change was made (1116), a check is made to determine if the potential donor device is being used by at least one service class that is more important than the potential receiver (1117). Potential donor device that are being used by service classes that are more important than the receiver service class are not used as donors and the adjustment method proceeds to check for more potential donors (1115). A device/service class bitmap is used to check for the relative importance of receiver and potential donors.

The check for a long enough time between changes (1117) is used to allow the goal based adjustment method more frequent opportunities to make changes than the efficiency adjustment method, as discussed below with regard to contention management. The goal adjustment method may make changes every minute while the efficiency adjustment method must wait 3 minutes between changes. Similar to the efficiency adjustment method the alias move is only made if adding an alias to the receiver device will have a positive effect on the work accessing the receiver device. If these checks indicate that the move is of value, then the alias is moved from the donor device to the receiver (1118) and the adjustment method exits (1104).

Contention Management

In preferred embodiments of the present invention, three types of contention are possible. First, multiple hosts may attempt concurrent changes to an alias address. Second, multiple hosts may attempt to change a specific alias within a brief period of time. Third, multiple assignment methods may be running concurrently on one host or several hosts. The solution to first problem involves serialization of alias moves by the use of a token. The solution to the second problem involves the use of time stamp, to limit the frequency with which any specific alias may be reassigned. The solution to third problem involves the use of a time stamp, as well as the designation of one reassignment method as the dominant method.

Serialization of Alias Moves—Token Management.

To serialize alias adjustments across multiple systems in the sysplex, IOS tracks a token for each PAV-device. This token is updated each time an alias change is made for the device. Once IOS has started the I/O operation to move an alias, the DASD subsystem does not accept further I/O requests for the devices involved until all systems have been notified of the change through an interrupt. When processing the interrupt, IOS updates the token for the devices involved in the alias change. IOS provides this token to WLM when WLM queries for information about PAV-devices. On any request to move an alias, WLM provides the token back to IOS, and IOS rejects the request if the tokens do not match. The token would not match if another system made an alias change since the time WLM queried IOS for the PAV-device data. In a sense this token mechanism allows WLM to do a logical compare and swap when changing aliases based on the token.

Figure 12:
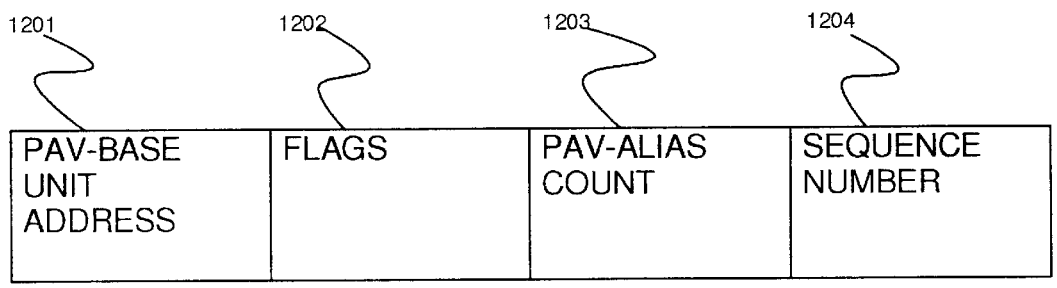
FIG. 12 illustrates the PAV token, in accordance with preferred embodiments of the present invention.

A PAV-token (FIG. 12) is maintained for every PAV-base device (609) in order to provide a mechanism for the operating system to provide multi-system serialization for the dynamic PAV-alias changes managed by WLM. Use of the PAV-token eliminates the need for explicit messaging between the operating systems sharing the devices that are being managed by WLM. The PAV-token consists of the following information: PAV-base Unit Address (1201) is the physical unit address of the PAV-base device; the Flags (1202) field consists of a bit that indicates when the PAV-base Unit Address (1201) is valid; PAV-alias Count (1203) is the count of the number of PAV-alias devices are currently bound to this PAV-base device; Sequence Number (1204) is the count of the number of times that the set of PAV-alias devices has changed for this PAV-base device.

Figure 13:
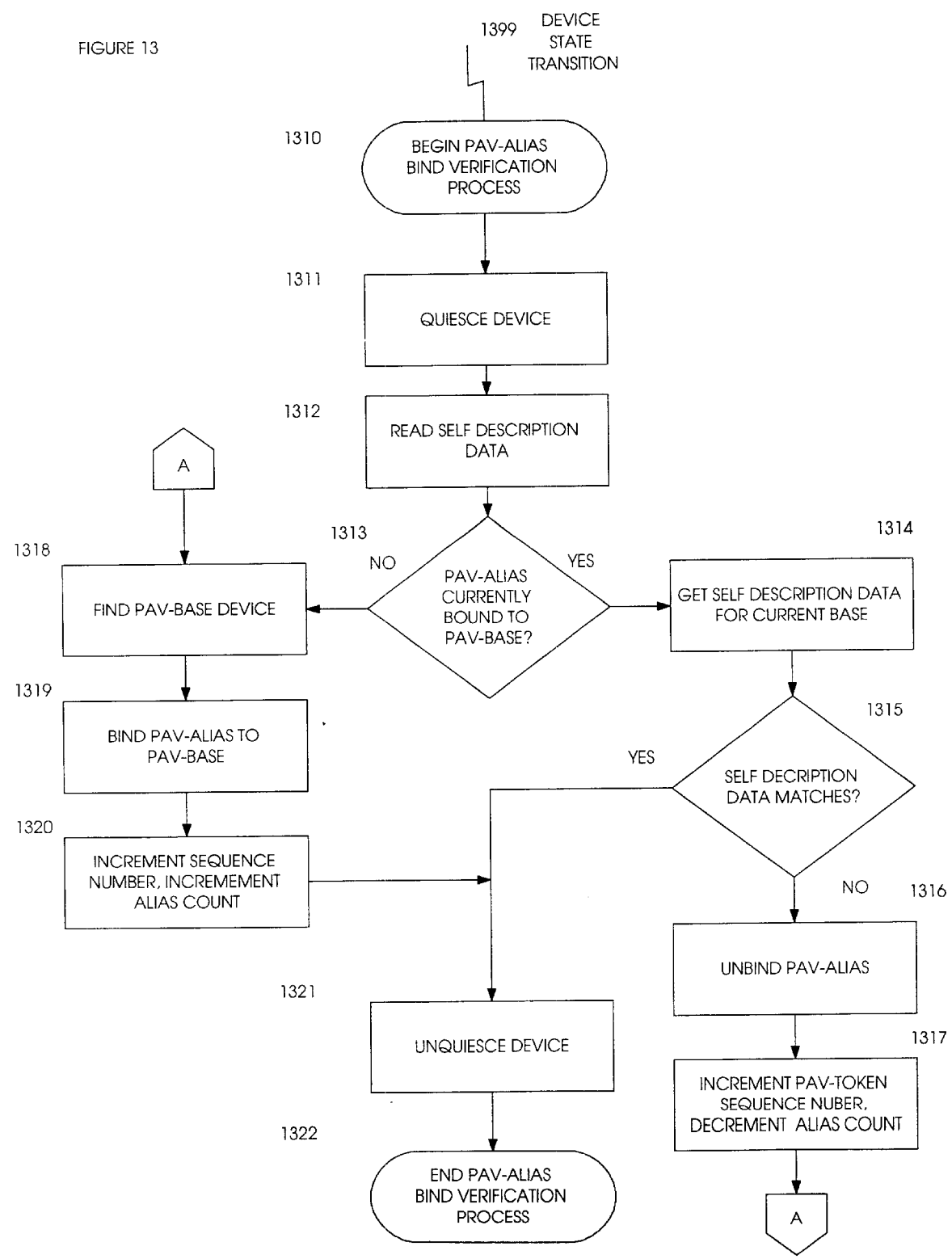
FIG. 13 illustrates a method used to maintain the PAV token, in accordance with preferred embodiments of the present invention.

FIG. 13 shows the processing used to maintain the PAV-token. When the PAV-base is first brought online its self description data is read and stored into the Configuration Data Table (CDT) as described in the prior art (reference PAV patent application). The unit address for the base, returned in the self description data, is saved into the PAV-token (1201) and the flag indicating the UA is valid (1202) is set on. Whenever a device-state-transition interrupt (1399) occurs for a PAV-alias device, the bind verification process begins (1310). First, the PAV-alias device is quiesced (1202) for I/O operations. Next, the device self description data is read and stored into the CDT. If the PAV-alias is not already bound to a PAV-base (1313) then the matching PAV-base is found from searching the CDT (1318). Once the matching PAV-base is found then the PAV-alias is bound to it (1319). As part of the bind process, the PAV-token is updated to show the new state of the PAV-base device. The sequence number and the number of current PAV-aliases are both incremented (1320).

If the PAV-alias was already bound to a PAV-base (1313) then the self description data for the current PAV-base is retrieved from the CDT (1314). If the PAV-alias is correctly bound to the current base (1315) then processing ends by unquiescing the device (1321) and terminating the process (1322). However, if the PAV-alias no longer should be bound to the current PAV-base then it is unbound (1316). The PAV-token for the PAV-base device is updated by incrementing the sequence number and decrementing the current alias count (1317). Processing then continues to step (1318) to find the correct base in which to bind the PAV-alias device.

Figure 9A:
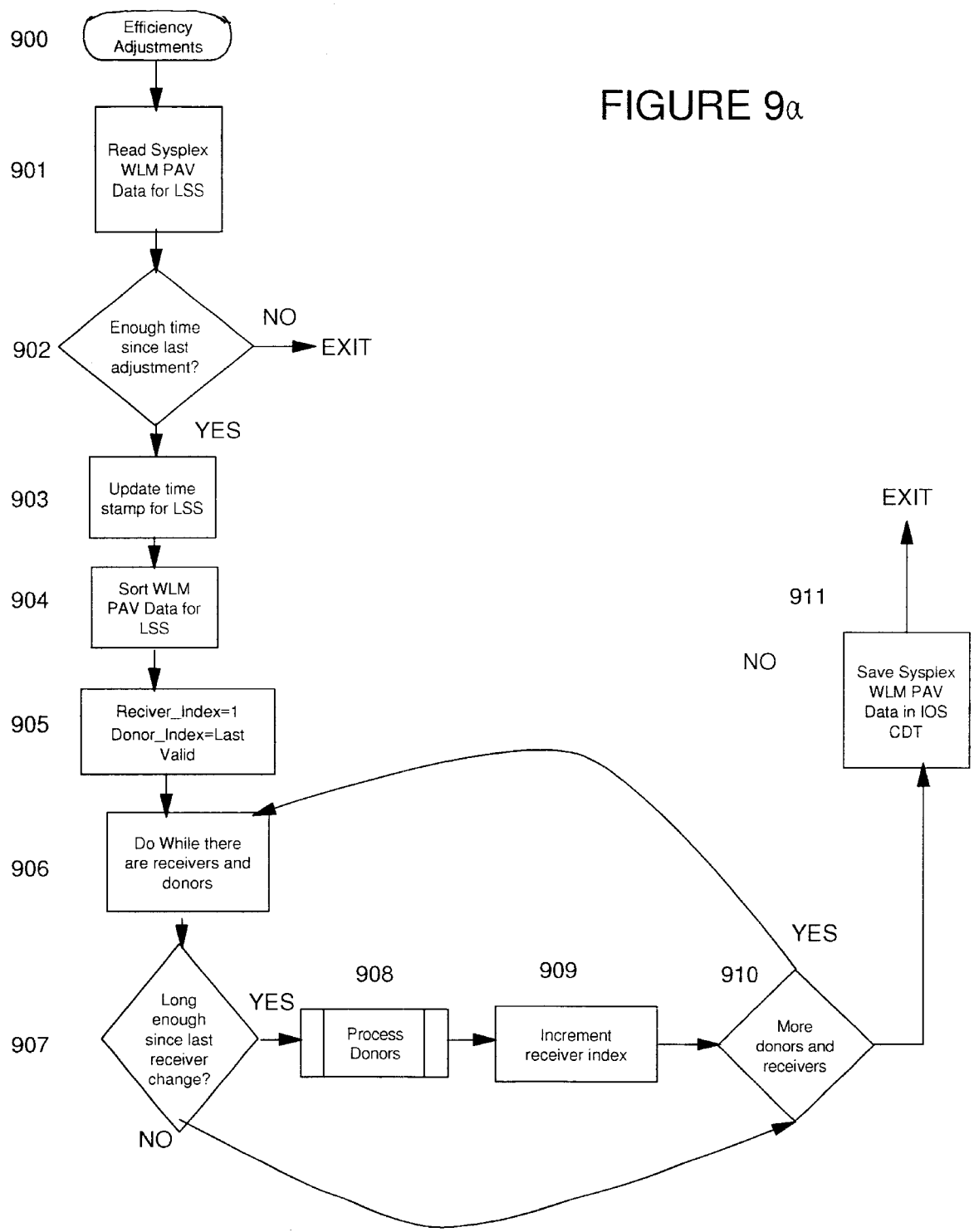
FIGS. 9a and 9b illustrate the efficiency adjustment method in accordance with preferred embodiments of the present invention.
Figure 9B:
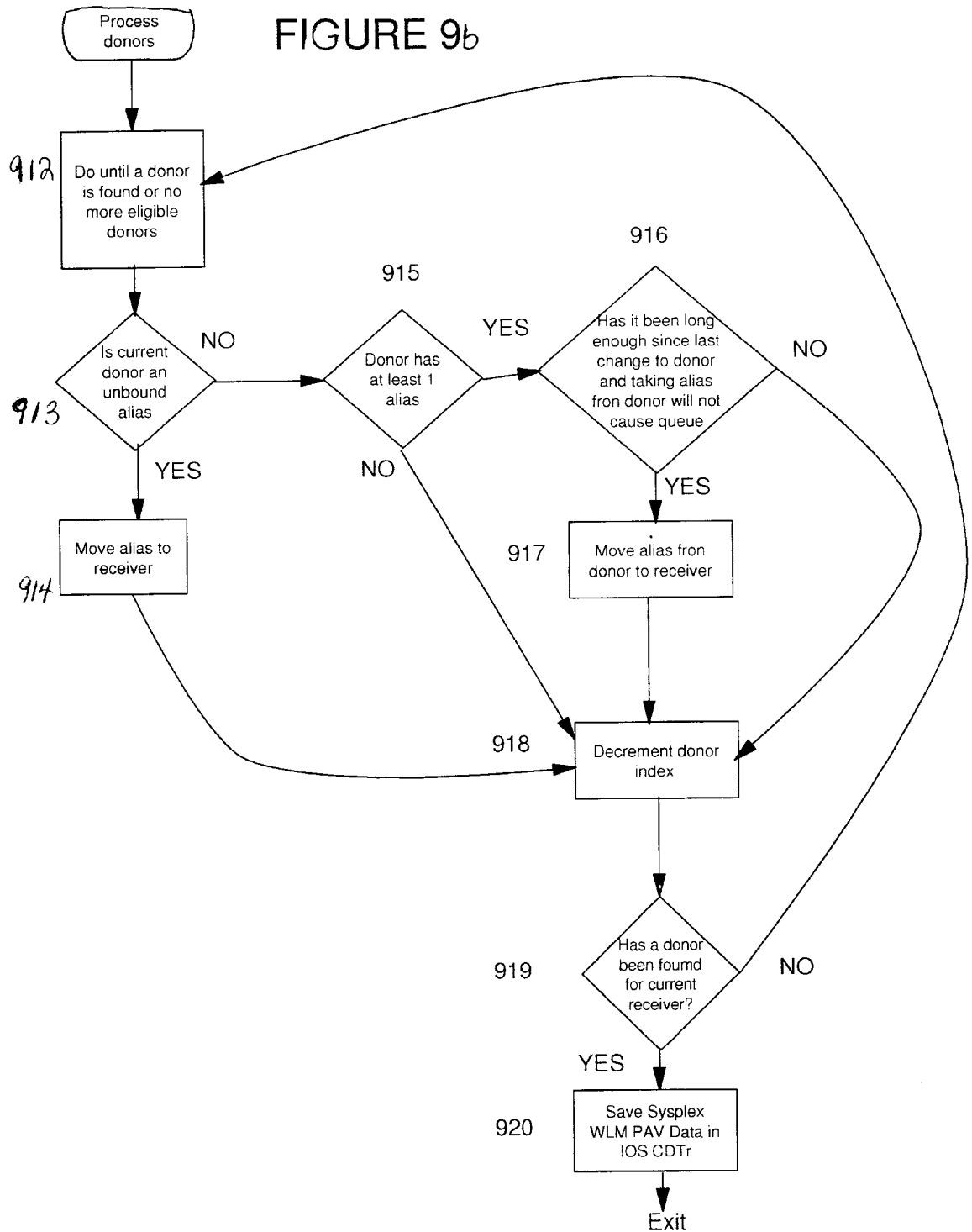
Figure 11:
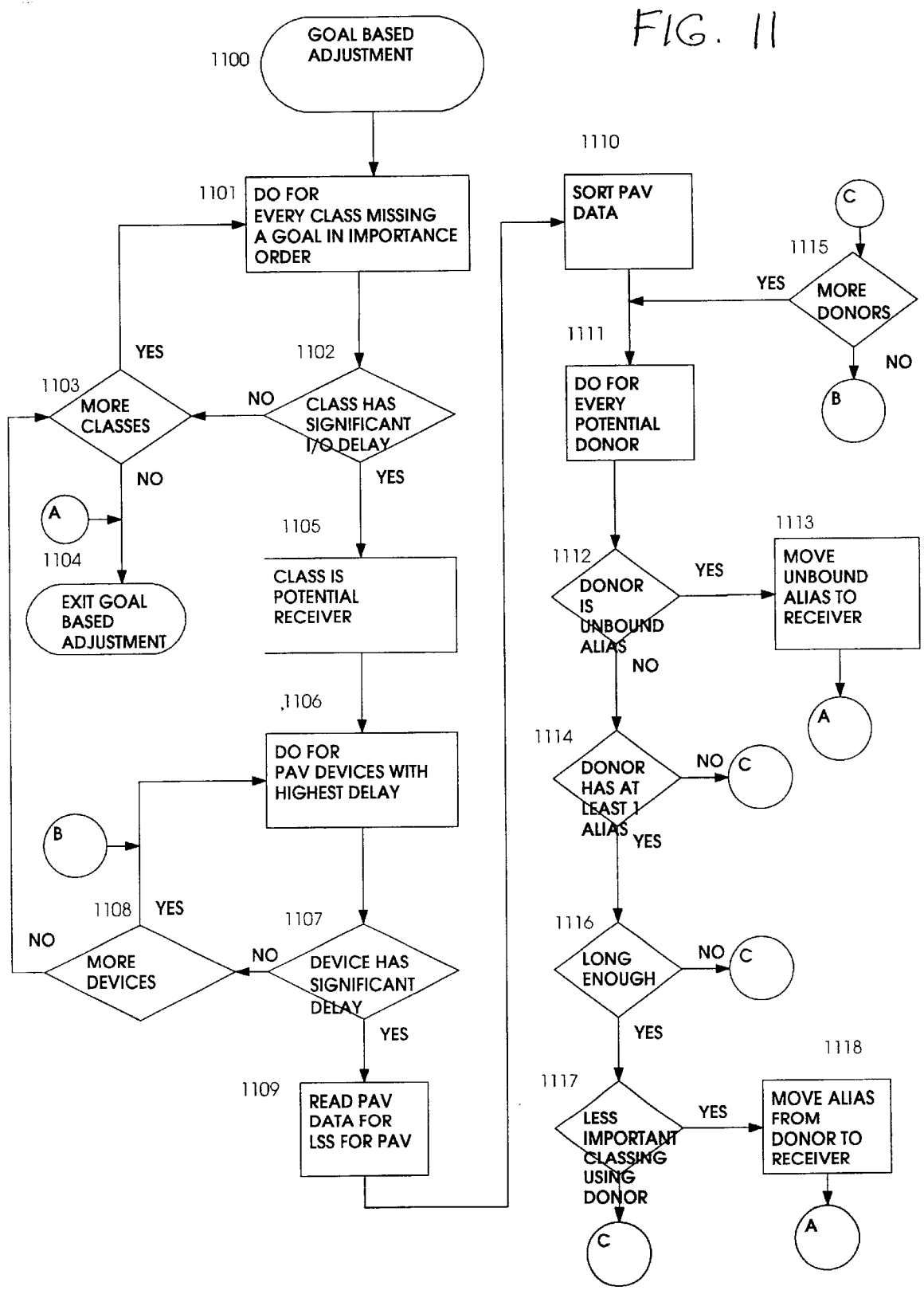
FIG. 11 illustrates the performance goal adjustment method, in accordance with preferred embodiments of the present invention.
Figure 14:
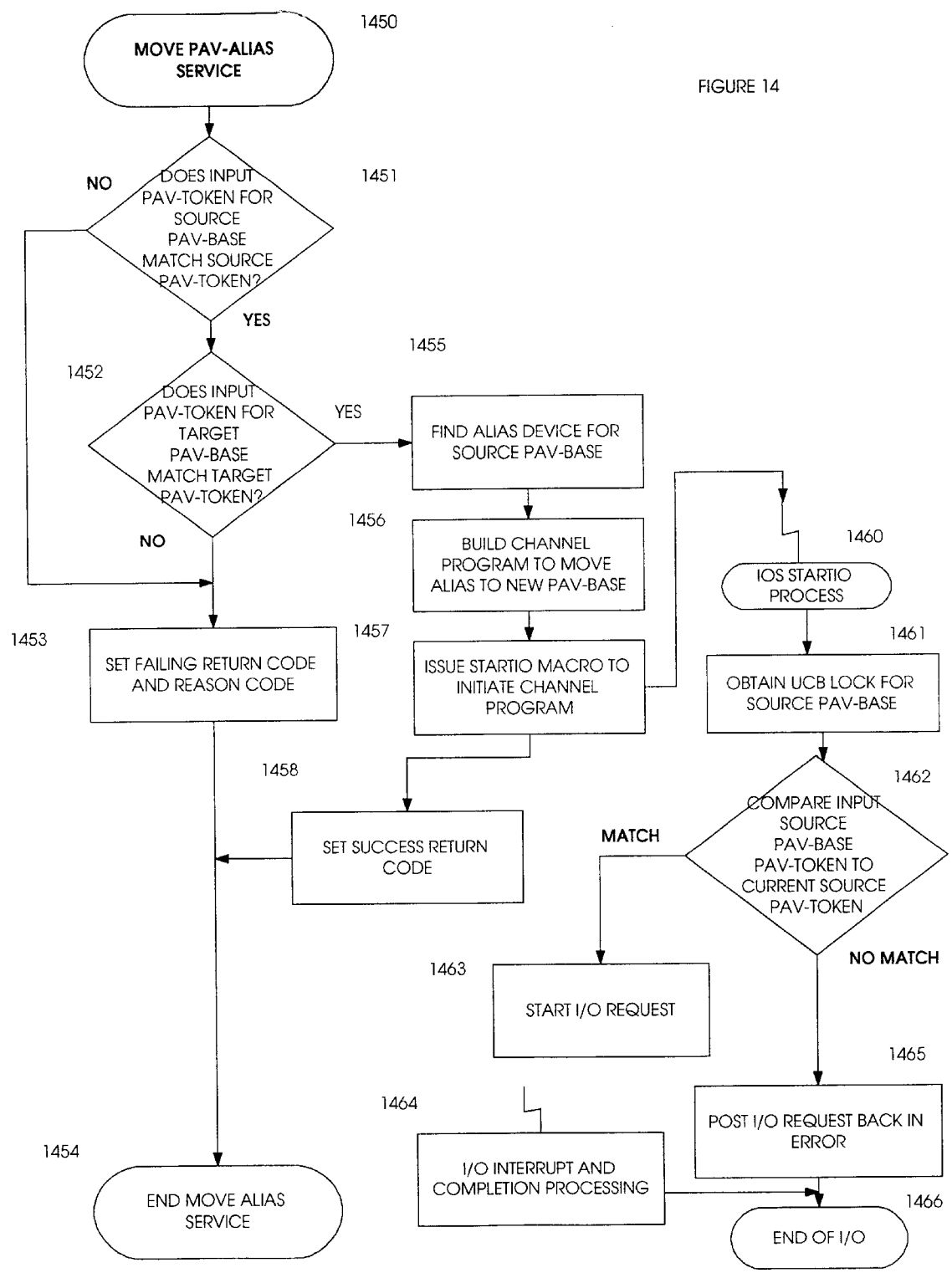
FIG. 14 illustrates a method of utilizing the PAV token to serialize alias moves, in accordance with preferred embodiments of the present invention.

By managing the PAV-token (FIG. 9a) in this way, the operating system can track the changes that occur for a PAV-ase device with respect to the set of PAV-aliases that access it. FIG. 14 shows how the PAV-token is used to insure that only one system updates the PAV-aliases for a device in an interval. When WLM determines that moving and alias from one PAV-base to another (or assigning an unbound PAV-alias) is required the IOS Move PAV-alias service is invoked (1450). Inputs to the service consist of the source and target PAV-base device numbers (601) and the corresponding PAV-tokens for the source and target PAV-base devices (609). The Move Alias Service verifies that niether the source or target PAV-base devices has had a change to its set of PAV-alias devices by verifying that the PAV-token has not changed for either device (1451, 1452). If either device has had a PAV-alias change, then a bad return code and reason code are set (1453) and control is passed back to the caller of the service (1454). If the source and target PAV-tokens match the corresponding devices, then processing continues by selecting the first PAV-alias that is bound to the source PAV-base device (1455). The channel program is constructed to move the PAV-alias from the source PAV-base to the target PAV-base (1456) using the unit address of the target PAV-base (1201). The channel program is then sent to IOS for execution by issuing the STARTIO macro (1457). Control is then returned to the caller of the service with a good return code (1458, 1454). When the I/O request is ready to be started by IOS (1460), the device is locked (UCB lock) (1461) and the I/O driver STARTIO exit is invoked to verify that the source PAV-base PAV-token still matches the input PAV-base PAV-token (1462). If the PAV-tokens do not match then the PAV-base has had a PAV-alias change made already for this interval, the I/O request is posted back with a permanent I/O error (1465). If the PAV-tokens still match (1462) then the I/O request is started at the selected PAV-alias bound to the target PAV-base device (1463). When the I/O request completes (1463), completion processing is performed and the I/O request is posted back with a completion code (1466).

Successive Attempts to Reassign an Alias Within an Analysis Period: Time Stamping IOS will also update a time stamp when it processes an alias change for a PAV-device. By checking this time stamp WLM can avoid making multiple alias changes to a single device in quick succession from multiple systems.

Multiple Concurrent Reassignment Methods: Time Stamp, Designation of Dominant Method With multiple adjustment methods operating concurrently, one method is designated as the dominant method. The dominant method is run more frequently than the other adjustment methods which allows the dominant method more chances to make alias moves. In a preferred embodiment the goal adjustment method is the dominant method. The frequency of the goal adjustment method is once per minute on each system while the efficiency adjustment method is run once every three minutes (902). The higher frequency of the goal adjustment method ensures that attainment of goals is prioritized over efficiency based decisions.

What is claimed is:

1. In an information handling system in which one or more central processing units (CPUs) access one of a plurality of input/output (I/O) devices via one of a plurality of device addresses and in which I/O requests for a particular device are placed in an I/O queue for that device, each of said device addresses being assigned to at most one of said devices, a method for dynamically managing the assignment of said device addresses to said devices, said method comprising the steps of:

generating for each of said devices a performance measure indicating how well request for that device are being handled;

selecting one of said devices on the basis of its performance measure as a receiver device for the reassignment of one or more additional device addresses to that device; and issuing in one of said one or more central processing units a command to a second processor, instructing said second processor to reassign one or more of said device addresses to the selected receiver device that are not currently assigned to said receiver device.

2. The method of claim 1 in which the device addresses reassigned to the selected receiver device are not currently assigned to any of said devices.

3. The method of claim 1 in which the device addresses reassigned to the selected receiver device are currently assigned to one or more of said devices.

4. The method of claim 3, comprising the further step of:

selecting one of said devices on the basis of its performance measure as a donor device for the reassignment of one or more device addresses from that device to the receiver device.

5. The method of claim 4, comprising the further steps of:

determining the negative effect on the performance measure for said selected donor device of reassigning said one or more device addresses from said donor device;

deselecting said selected donor device for the reassignment of one or more device addresses from that device to the receiver device, if said negative effect on the performance measure for said selected device exceeds a threshold.

6. The method of claim 1 in which the performance measure for each device is based on the nunmber of requests in the queue for that device.

7. The method of claim 1 in which said method is performed by a plurality of host systems.

8. The method of claim 7, in which said performance measure generated for each device is shared among host systems.

9. The method of claim 7, in which a token is used to serialize device address reassignments.

10. The method of claim 7, in which a time stamp is used to prevent multiple reassignments of any one of said device addresses in rapid succession.

11. In an information handling system in which one or more central processing units (CPUs) access one of a plurality of input/output (I/O) devices via one of a plurality of device addresses, and in which I/O requests for a particular device are placed in an I/O queue for that device, each of said device addresses being assigned to at-most one of said devices, and in which system workload is organized into two or more service classes, each of said service classes having one or more processing goals, and in which each of said service classes is assigned an importance index relative to others of said two or more service classes, a method for dynamically managing the assignment of said device addresses to said devices, said method comprising the steps of:

generating for each of said devices a performance measure indicating how well requests for that device are being handled;

associating with each one of said devices the service classes using said one device;

determining that one of said service classes is failing to meet one or more performance goals;

determining the positive effect on the performance of said one service class of reassigning one or more device addresses to a receiver device used by said one service class;

identifying a one or more donor devices used by service classes of lesser relative importance that said one service class;

issuing in one of said one or more central processing units a command to a second processor, instructing said second processor to reassign one or more of said donor addresses to the said receiver device.

12. The method of claim 11 in which the device addresses reassigned to the selected receiver device are not currently assigned to any of said devices.

13. The method of claim 11 in which the device addresses reassigned to the selected receiver device are currently assigned to one or more of said devices.

14. The method of claim 11 in which the performance measure for each device is based on the number of requests in the queue for that device.

15. The method of claim 11 in which said method is performed by a plurality of host systems.

16. The method of claim 15, in which said performance measure generated for each device is shared among host systems.

17. The method of claim 15, in which a token is used to serialize device address reassignments.

18. The method of claim 15, in which a time stamp is used to prevent multiple reassignments of any one of said device addresses in rapid succession.

19. In an information handling system in which a plurality of central processing units (CPUs) access one of a plurality of input/output (I/O) devices via one of a plurality of device addresses, and in which I/O requests for a particular device are placed in an I/O queue for that device, each of said device addresses being assigned to at most one of said devices, and in which is available a plurality of assignment methods for dynamically managing the assignment of said device addresses, and in which a plurality of said assignment methods operate concurrently, a method for contention management among said assignment methods, said contention management method comprising the steps of:

designating one of said assignment methods as the dominant assignment method;

designating all other of said assignment methods as subordinate assignment methods;

operating said dominant assignment method more frequently than any of said subordinate methods;

preventing a subordinate assignment method from reassigning a device address, where said device address was recently reassigned by the dominant assignment method.

20. The method of claim 18, in which a time stamp is used.

21. The method of claim 18, in which a token is used to serialize address assignments.

22. A computer program storage device readable by a machine, tangibly embodying a program of instructions executable by the machine to perform method steps for dynamically managing the assignment of device addresses to I/O devices, in an information handling system in which one or more central processing units (CPUs) access one of a plurality of input/output (I/O) devices via one of a plurality of device addresses and in which I/O requests for a particular device are placed in an I/O queue for that device, each of said device addresses being assigned to at most one of said devices, said method comprising the steps of:

generating for each of said devices a performance measure indicating how well request for that device are being handled;

selecting one of said devices on the basis of its performance measure as a receiver device for the reassignment of one or more additional device addresses to that device; and issuing in one of said one or more central processing units a command to a second processor, instructing said second processor to reassign one or more of said device addresses to the selected receiver device that are not currently assigned to said receiver device.

23. A computer program storage device readable by a machine, tangibly embodying a program of instructions executable by the machine to perform method steps for dynamically managing the assignment of device addresses to input/output (I/O) devices in an information handling system in which one or more central processing units (CPUs) access one of a plurality of input/output (I/O) devices via one of a plurality of device addresses, and in which I/O requests for a particular device are placed in an I/O queue for that device, each of said device addresses being assigned to at most one of said devices, and in which system workload is organized into two or more service classes, each of said service classes having one or more processing goals, and in which each of said service classes is assigned an importance index relative to others of said two or more service classes, said method comprising the steps of:

generating for each of said devices a performance measure indicating how well requests for that device are being handled;

associating with each one of said devices the service classes using said one device;

determining that one of said service classes is failing to meet one or more performance goals;

determining the positive effect on the performance of said one service class of reassigning one or more device addresses to a receiver device used by said one service class;

identifying a one or more donor devices used by service classes of lesser relative importance that said one service class;

issuing in one of said one or more central processing units a command to a second processor, instructing said second processor to reassign one or more of said donor addresses to the said receiver device.

* * * * *